United States Patent
Tubati et al.

(10) Patent No.: US 12,495,173 B1
(45) Date of Patent: Dec. 9, 2025

(54) MEDIA FRAUD DETECTION SYSTEM

(71) Applicant: Amazon Technologies, Inc., Seattle, WA (US)

(72) Inventors: Sudheer Babu Tubati, Seattle, WA (US); Amit Goyal, San Francisco, CA (US); Rohan Gurappagouda Patil, Mill Creek, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/812,508

(22) Filed: Aug. 22, 2024

(51) Int. Cl.
  *H04N 21/24* (2011.01)
  *G06F 18/23213* (2023.01)
  *G06N 20/00* (2019.01)
  *G06Q 30/018* (2023.01)

(52) U.S. Cl.
  CPC ... *H04N 21/2407* (2013.01); *G06F 18/23213* (2023.01); *G06N 20/00* (2019.01); *G06Q 30/0185* (2013.01)

(58) Field of Classification Search
  None
  See application file for complete search history.

(56) References Cited

U.S. PATENT DOCUMENTS 11,954,685 B2 * 4/2024 Cartella ............... G06Q 20/401
2017/0289226 A1 * 10/2017 Deshpande ............ H04L 67/14

* cited by examiner

Primary Examiner — Omar S Parra
(74) Attorney, Agent, or Firm — K&L Gates LLP

(57) ABSTRACT

Systems and techniques are disclosed for detecting fraudulent activity by users of a media service, such as a music or video streaming service. Fraudulent activity may artificially modify metrics tracked by the media service, thus impacting chart positions, media recommendations, royalty amounts, and other elements determined by the media service. Media usage data associated with user activity samples is labeled to identify fraud samples and non-fraud samples. Because the majority of user activity on the media service may be legitimate such a number of labeled non-fraud samples exceeds a number of labeled fraud samples, a balanced training data set is created via undersampling to reduce the number of non-fraud samples to be equal or closer to the number of fraud samples. The balanced training data set is used to train a machine learning model to generate fraud predictions associated with new user activity on the media service.

20 Claims, 8 Drawing Sheets

MEDIA FRAUD DETECTION SYSTEM

BACKGROUND

Users of a media service, such as a music streaming, video streaming service, or other type of media service may access media content via the media service. For instance, users may use computers, mobile devices, and/or other types of user devices to access the media service, and to download, stream, and/or otherwise access media content via the media service.

The media service may track metrics indicating how individual users are using the media service, and use those metrics for various purposes. As an example, if the media service is a music service, the music service may track which songs and/or artists have been popular among a set of users, and use that data to recommend those songs and/or artists to other users. As another example, a music service may determine an amount of royalties to pay a musical artist based on a number of times that musical artist's songs have been streamed by users.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
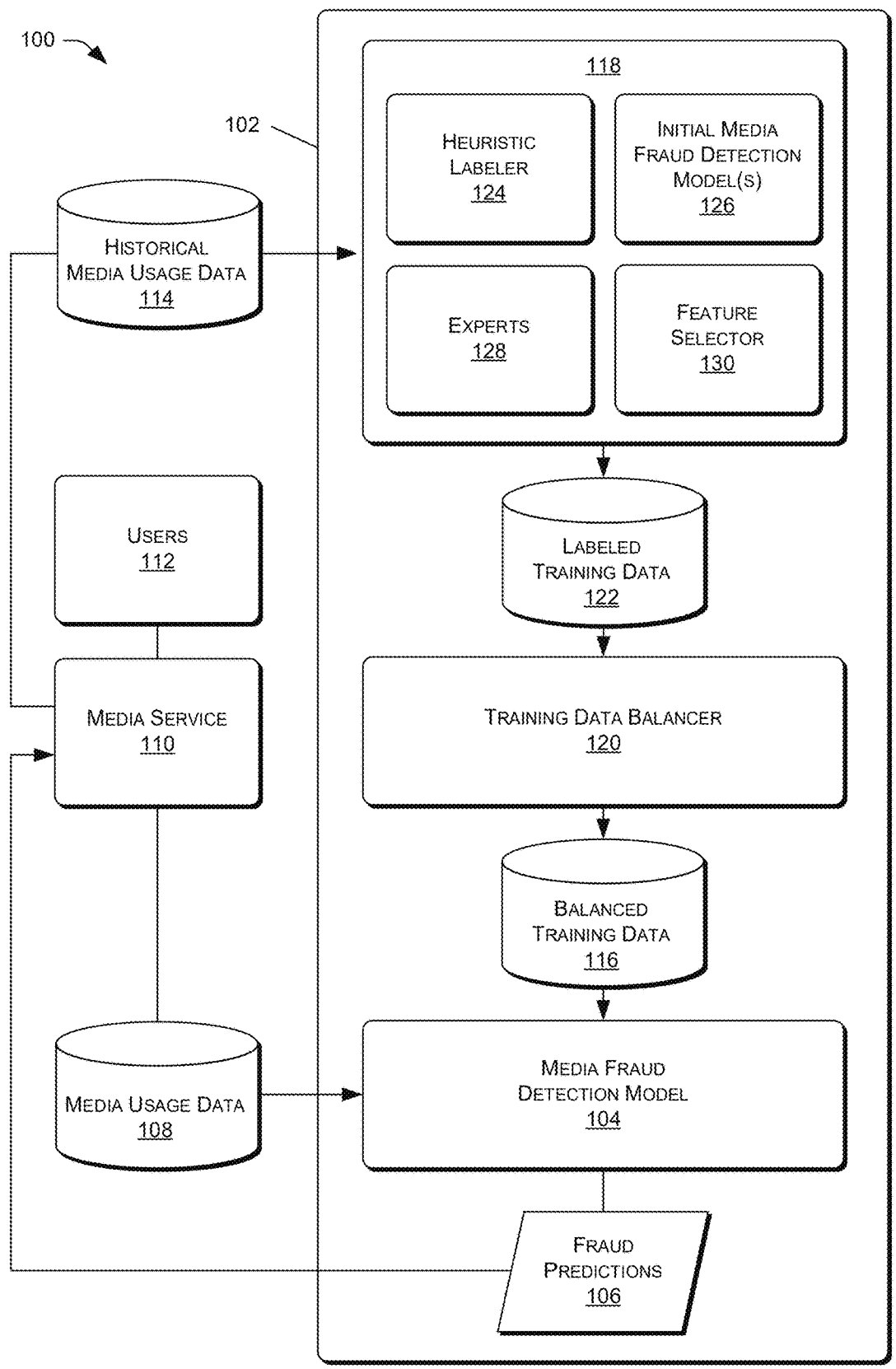
FIG. 1 shows an example of a media fraud detection system in which a media fraud detection model is trained to generate fraud predictions based on media usage data associated with a media service.

A media service may allow users to stream, download, and/or otherwise access media content via corresponding user devices or other computing systems. The media content may include music, other audio content, movies, television shows, other video content, books, other textual and/or visual content, and/or other types of media content. As an example, the media service may be a music service that allows users to stream, download, and/or otherwise access songs, podcasts, and/or other audio content. For instance, the music service may allow users to select songs, albums, playlists, and/or other music content, and may stream the selected music content to user devices associated with the users. As another example, the media service may be a video service that allows users to stream, download, and/or otherwise access video clips, movies, television shows, and/or other video content.

In some examples, the media service may allow users to upload and/or publish media content, such that the media content becomes accessible to users of the media service. For example, a band may upload an album of songs to the media service, such that users of the media service may listen to any or all of the songs on the band's album via the media service.

The media service may track media usage data indicating which media content items are accessed by users, how often media content items are accessed by users, and/or other statistics and metrics associated with usage of the media service by users. The media service may use the media usage data for one or more purposes. For example, the media service may use the media service data to determine how many times media content items have been accessed by users during a period of time, for instance so that "most-played" charts or other rankings of accessed media content during that period of time may be determined and/or displayed to users. The media service may also, or alternately, use the media usage data to determine which media content items are popular among different groups of users, and should be recommended by the media service to users in those groups. The media service may also, or alternately, use the media usage data to determine royalty amounts to pay to providers of media content items. For example, the media service may pay royalty amounts to providers of media content items based on numbers of times those media content items are accessed by users during corresponding periods of time.

However, although most users of the media service may be legitimate users, some users may engage in fraudulent activity via the media service. Fraudulent activity may be associated with abnormal or non-routine behavior, relative to normal or routine behavior of most users of the media service. Fraudulent activity may also, or alternately, be intended to artificially impact and/or adjust the media usage data tracked by the media service. As an example, if a user publishes a song via the media service, the user may frequently or continuously stream that song via the media service over an extended period of time via one or more user devices, via automated bots, and/or via other systems or techniques, in an attempt to artificially change how the media service operates with respect to that song. For instance, the user may continuously stream the song in an attempt to fraudulently increase the amount of royalties that the media service will pay to the user based on a number of times the song has been played via the media service. Similarly, the user may continuously stream the song in an attempt to boost the song's position on a chart of most-played songs that may be displayed to other users, in an attempt to make the media service more likely to recommend the song to other users, and/or to otherwise manipulate how the song is treated by the media service. As another example, a group of fans of a particular band may make a concerted effort to stream the band's songs continuously or more often they would otherwise, in an attempt to boost that band's position on streaming charts, make the media service more likely to recommend the band's songs, and/or to increase the amount of royalties that the media service will pay to the band.

Such fraudulent activity by users of the media service may cause the media service to inaccurately determine popularity levels of content items, cause the media service to inaccurately determine royalty amounts to be paid to content creators, and/or present other problems for the media service. As an example, if users are able to engage in fraudulent activity to artificially manipulate the popularity levels of certain media content items indicated by the media usage data, other users may lose trust in corresponding charts, playlists, and/or recommendations presented to those users by the media service based on the artificially-manipulated popularity levels of those media content items. Moreover, if content creators determine that fraudulent activity is able to boost positions of media content items on charts and/or lead to the media content items being recommended by the media service more frequently, the content creators may be incentivized to engage in the fraudulent activity.

As another example, the media service may determine royalty payments to be paid to content creators by dividing a fixed amount of royalty funds among the content creators based on numbers of times media content items provided by those content creators have been accessed by users. Accordingly, if a user has engaged in fraudulent activity in order to artificially increase the number of times a song or other media content item uploaded by that user has been accessed, the user's fraudulent activity may cause the user to receive an increased percentage of the fixed amount of royalty funds, and in turn cause other legitimate users to receive decreased percentages of the fixed amount of royalty funds. Similarly, if the media service determines royalty payment amount based on a number of times a particular media content item has been accessed, a user who uploaded that particular media content item may frequently or continuously stream or access that particular media content item via the media service in order to increase the corresponding royalty payment amount the media service will pay the user. If such fraudulent activity leads to such financial benefits for fraudulent users, and/or leads to corresponding negative financial impacts on legitimate users, users may lose trust in the media service's royalty payment system and/or legitimate users may be incentivized to begin engaging in fraudulent activity to increase the amounts of royalty payments they receive from the media service.

Accordingly, an operator of the media service may desire to detect fraudulent activity by users, so that the fraudulent activity can be flagged or ignored when generating most-played charts, when generating recommendations for users, when determining royalty amounts, and/or during other operations. Detecting and ignoring fraudulent activity may thus improve the media service by making charts, recommendations, royalty payment amounts, and/or other features more accurate, may increase users' trust and confidence levels in the media service, and/or may have other benefits.

However, it may be difficult to determine whether user activity on the media service is fraudulent. For instance, it may be difficult to determine whether a user is repeatedly listening to a particular song because the user simply enjoys that song, or whether the user is repeatedly listening to the song in an attempt to artificially increase the song's play count on the media service such that the song appears to be more popular than actually it is and/or so that the corresponding content creator receives an inflated royalty payment.

Described herein is a media fraud detection system that uses machine learning techniques to evaluate media usage data associated with the media service in order to generate corresponding fraud predictions indicating whether user activity on the media service is likely to be fraudulent. If the media fraud detection system determine that a user's activity on the media service is likely to be fraudulent, the media service may flag and/or ignore the user's activity when generating charts, playlists, or recommendations, when determining royalty payments, and/or when performing other operations. For example, if the media fraud detection system generates a fraud prediction indicating that a particular user is likely to be a fraudulent user who is trying to artificially increase a play count metric indicating how many times a particular song has been played via the media service, the media service may avoid incrementing the play count metric for the song based on the particular user's activity in order to more accurately determine and/or track the play count metric based on legitimate user activity from other users. By using the media fraud detection system to detect and ignore fraudulent user activity on the media service, the media service may more accurately determine more charts, recommendations, royalty payment amounts, and/or other elements based on other legitimate user activity.

The systems and methods associated with the media fraud detection system described herein may be implemented in a number of ways. Example implementations are provided below with reference to the following figures.

FIG. 1 shows an example 100 of a media fraud detection system 102 in which a media fraud detection model 104 is trained to generate fraud predictions 106 based on media usage data 108 associated with a media service 110. The media service 110 may be a service or platform that allows users 112, such as customers or other users of the media service 110, to access media content via corresponding user devices. The media content may include music, other audio content, movies, television shows, other video content, books, other textual and/or visual content, and/or other types of media content. As an example, the media service 110 may be a music service that allows users 112 to stream, download, and/or otherwise access songs, podcasts, and/or other audio content. As another example, the media service 110 may be a video service that allows users 112 to stream, download, and/or otherwise access video clips, movies, television shows, and/or other video content.

Users 112 may access the media service 110, and/or media content provided by the media service 110, via user devices. For instance, users 112 may access the media service 110 and/or media content via a website that may be loaded by computers, mobile devices, or other user devices, via applications executing on computers, mobile devices, or other user devices, via smart speakers or other streaming devices, and/or other types of user devices.

In some examples, the media service 110 may accept and/or publish user-created and/or user-provided content. For example, a band may record songs, and may publish those songs on the media service 110 so that other users 112 may listen to the band's songs via the media service 110. Similarly, a video content creator may create a video clip, and may publish the video clip on the media service 110 so that other users 112 may watch the video clip via the media service 110. The media service 110 may in some examples pay royalties or other payments to users 112 who have published such media content, for instance based on how many times a user's content is accessed via the media service 110.

The media service 110 may determine and/or track media usage data 108 associated with usage of the media service 110 by users 112. The media usage data 108 may include metrics and/or other information indicating how users 112 are currently using the media service 110 and/or how the users 112 have recently used the media service 110. For example, if the media service 110 is a music streaming service, the media usage data 108 may indicate which songs, albums, playlists, artists, and/or other elements users 112 have accessed, durations of time users 112 listened to songs, albums, playlists, artists, or other elements, times of day when users 112 accessed particular elements, types of user devices used by users 112, whether users 112 accessed elements via searches, playlists, links, or other access techniques, and/or other metrics and data. The media service 110 may also use the media usage data 108 to derive and/or store similar historical media usage data 114 over time. The historical media usage data 114 may include some or all of the same types of data as the media usage data 108 about current and/or recent usage, and may indicate how users 112 used the media service during previous periods of time, such as during historical weekly periods, monthly periods, yearly periods, or other periods of time.

The media fraud detection system 102 may be an element of the media service 110, or may be a separate element that is configured to access and process data provided by the media service 110, such as media usage data 108 and/or historical media usage data 114. The media fraud detection system 102 may include the media fraud detection model 104, which may be a machine learning model that has been trained as described further below. The media fraud detection model 104 may be trained to evaluate the media usage data 108 associated with the media service 110, and to generate corresponding fraud predictions 106 indicating when and/or if users 112 are engaging in fraudulent activity via the media service 110. Fraudulent activity may be associated with abnormal or non-routine behavior, relative to normal or routine behavior of most users 112 of the media service 110. Fraudulent activity may also, or alternately, be intended to artificially impact and/or adjust the media usage data 108 and/or historical media usage data 114 tracked by the media service 110.

For example, one or more users 112 may engage in fraudulent activity in attempts to artificially increase metrics in the media usage data 108 and/or the historical media usage data 114 that indicate how often media content items are accessed by users 112 of the media service 110, for instance to boost those media content items on charts, cause the media service 110 to be more likely to recommend the media content items to users 112, to increase royalty payments to users 112 who provided the media content items to the media service 110, and/or for other reasons. The fraud predictions 106, generated by the media fraud detection model 104 based on the media usage data 108, may identify user activity that the media fraud detection model 104 determines is likely to be fraudulent, such that the likely-fraudulent user activity may be flagged, ignored, and/or otherwise handled by the media service 110.

As discussed above, the media fraud detection model 104 may be a machine learning model. In some examples, the media fraud detection model 104 may be a gradient boosted tree or gradient boosted machine model, such as a LightGBM (Light Gradient Boosting Machine) model, an XGBoost model, or a CatBoost model. As an example, a LightGBM model may be based on a gradient boosting framework that uses decision tree algorithms, and may execute more quickly and efficiently than other models by using a Gradient-based One-Side Sampling (GOSS) technique to filter out some data instances to focus on other data instances that provide the most information gain. In other examples, the media fraud detection model 104 may be based on deep learning algorithms, non-linear analysis, linear analysis, convolutional neural networks, recurrent neural networks, other types of neural networks, nearest-neighbor algorithms, Random Forest algorithms, decision trees, support-vector networks, and/or other types of artificial intelligence or machine learning frameworks.

The media fraud detection model 104 may be trained based on balanced training data 116 that is derived from the historical media usage data 114 as discussed further below. The historical media usage data 114 may be similar to the media usage data 108, and may indicate attributes of historical behavior of users of the media service over one or more past periods of time. Accordingly, once the media fraud detection model 104 has been trained based on balanced training data 116 derived from historical media usage data 114, the trained media fraud detection model 104 may be configured to evaluate new and/or current media usage data 108 and to generate corresponding fraud predictions 106.

The balanced training data 116, used to train the media fraud detection model 104, may be generated via one or more preprocessing elements 118 and a training data balancer 120 within the media fraud detection system 102. The one or more preprocessing elements 118 may process the historical media usage data 114 to produce labeled training data 122 that uses binary labels to identify samples of fraudulent user activity and samples of legitimate user activity. For example, the labeled training data 122 may include "fraud" labels associated with samples of suspected fraudulent user activity, and "non-fraud" labels associated with samples of suspected non-fraudulent legitimate user activity.

The training data balancer 120 may use the labeled training data 122 to generate corresponding balanced training data 116 that can be used to train the media fraud detection model 104. As will be discussed further below, the balanced training data 116 generated by the training data balancer 120 may be a version of the labeled training data 122 that has been adjusted to balance numbers of samples of fraudulent user activity and samples of legitimate user activity that are included in the balanced training data 116. For example, because actual fraudulent user activity may be rare within the media platform, relative to the amount of normal and legitimate user activity, the labeled training data 122 produced via the one or more preprocessing elements 118 may identify a relatively small number of samples of fraudulent user activity and a much larger number of samples of legitimate user activity. However, the balanced training data 116 generated by the training data balancer 120 may include information associated with equal, or closer, numbers of samples of fraudulent user activity and samples of legitimate user activity. For instance, the training data balancer 120 may use undersampling techniques select a subset of non-fraud samples from the labeled training data 122 to include in the balanced training data 116, such that the selected number of non-fraud samples in the training data balancer 120 is equal to, or closer to, a number of fraud samples identified by the labeled training data 122 that are also included in the balanced training data 116. The media fraud detection model 104 may be trained via supervised machine learning techniques based on the balanced training data 116, such that the trained media fraud detection model 104 may thereafter use new and/or current media usage data 108 to generate corresponding fraud predictions 106.

The preprocessing elements 118 that generate the labeled training data 122 may include at least one of a heuristic labeler 124, one or more initial media fraud detection models 126, or one or more experts 128. The historical media usage data 114 may not be labeled to indicate which samples of user activity are fraudulent and which samples of user activity are non-fraudulent. However, the heuristic labeler 124, one or more initial media fraud detection models 126, and/or one or more experts 128 may generate the labeled training data 122 by evaluating the historical media usage data 114 and determining binary labels for respective samples of user activity that indicate whether the samples of user activity are suspected to be fraudulent or non-fraudulent.

In some examples, the preprocessing elements 118 may apply one or more filters to the historical media usage data 114 to identify samples of user activity that are highly unlikely to be associated with fraud. Accordingly, the media fraud detection system 102 may avoid using the preprocessing elements 118 and/or other elements to process some of the historical media usage data 114 that is associated with user activity that is highly unlikely to be associated with fraud, and thereby reduce the amount of data processed by the preprocessing elements 118, the training data balancer 120, and other elements described herein.

As a non-limiting example, during tests in which the historical media usage data 114 included information about over 20 million users, statistics indicated that an average user 112 accessed around twenty media content items per day. Based on such statistics, a filter was defined during the tests to indicate that users 112 who access less than fifty media content items during a seven-day period may be highly unlikely to be engaging in fraudulent activity, and may be filtered out such that corresponding historical media usage data 114 is not evaluated by preprocessing elements 118 or included in the labeled training data 122. Based on this filter, the set of users 112 to be evaluated by the preprocessing elements 118 during the tests was reduced from over 20 million users to a set of 11.3 million users. Accordingly, during tests the heuristic labeler 124 and/or other preprocessing elements 118 avoided processing a first subset of historical media usage data 114 associated with users 112 who accessed less than fifty media content items during a seven-day period, and instead processed a second subset of historical media usage data 114 associated with other users 112 who accessed fifty or more media content items during the seven-day period and were thus more likely to be associated with fraudulent activity.

The heuristic labeler 124 may be configured to generate labeled training data 122 by applying a set of heuristics to the historical media usage data 114. The heuristics may define conditions associated with predetermined categories of users 112 or user activity that have been determined by experts 128 or other entities as being likely to be associated with fraudulent activity or non-fraudulent activity. Accordingly, the heuristic labeler 124 may use the set of heuristics to apply labels such as "fraud" or "non-fraud" to samples of user activity indicated by the historical media usage data 114, to generate corresponding labeled training data 122.

As an example, the heuristic labeler 124 may be configured with a set of "non-fraud" heuristics that indicate that user activity associated with a user 112 should be labeled by the heuristic labeler 124 as "non-fraud" legitimate activity if corresponding historical media usage data 114 satisfies defined conditions for the "non-fraud" heuristics. As non-limiting examples, the set of "non-fraud" heuristics may indicate that user activity associated with a user 112 should be labeled as "non-fraud" legitimate activity if the user 112 is employee of the media service, if at least 80% of the media content accessed by the user 112 in the last seven days was provided by content providers on a predefined whitelist of content providers, if the user 112 has accessed less than one hundred and ten media content items in the last seven days and at least 80% of those media content items was provided by the three biggest content providers that supply media content to the media service 110, if the user 112 has accessed less than one hundred and ten media content items in the last seven days and at least 80% of those media content items were accessed via curated playlists provided to users 112 by the media service 110, or if the user 112 and/or the user's behavior meets predefined conditions associated with other "non-fraud" heuristics. The set of "non-fraud" heuristics may define other and/or different conditions indicating that associated user activity is to be labeled as "non-fraud" legitimate activity in the labeled training data 122.

As another example, the heuristic labeler 124 may be configured with a set of "fraud" heuristics that indicate that user activity associated with a user 112 should be labeled by the heuristic labeler 124 as "fraud" activity if corresponding historical media usage data 114 satisfies defined conditions for the "fraud" heuristics. As non-limiting examples, the set of "fraud" heuristics may indicate that user activity associated with a user 112 should be labeled as "fraud" activity if the user 112 is on a blacklist of previously-identified fraudulent users 112, if the user 112 has accessed more than three hundred and forty media content items in the last seven days and at least 80% of those media content items was provided by content providers on a blacklist of content providers who have previously been identified as fraudulent or as providing low-quality "spam" media content, or if the user 112 and/or the user's behavior meets predefined conditions associated with other "fraud" heuristics. The set of "fraud" heuristics may define other and/or different conditions indicating that associated user activity is to be labeled as "fraud" activity in the labeled training data 122.

In some examples, the heuristic labeler 124 may be configured to apply multiple heuristics in a predetermined hierarchical order, such that labels determined by later-applied heuristics may override labels determined by earlier-applied heuristics. For instance, the "non-fraud" heuristics may be applied prior to the "fraud" heuristics, such that if a user activity sample is labeled as "non-fraud" activity via one or more of the "non-fraud" heuristics, but a later-applied "fraud" heuristic is satisfied by the same user activity sample, the heuristic labeler 124 may override the "non-fraud" label and instead label the user activity sample with the "fraud" label. In other examples, the heuristic labeler 124 may be configured to label a user activity sample with the "fraud" label if any of the "fraud" heuristics apply to the user activity sample, regardless of whether any of the "non-fraud" heuristics apply to the user activity sample.

Some user activity samples indicated by the historical media usage data 114 may not satisfy conditions for either "non-fraud" heuristics or "fraud" heuristics applied by the heuristic labeler 124. Accordingly, the heuristic labeler 124 may leave such user activity samples unlabeled. As a non-limiting example, during tests in which the heuristic labeler 124 evaluated historical media usage data 114 about a set of 11.3 million users, 6.7 million (59%) did not satisfy conditions of any of a set of defined heuristics and remained unlabeled by the heuristic labeler 124. However, in this example, media usage data 108 associated with 4.6 million (41%) of the 11.3 million users satisfied conditions of at least one of the set of heuristics. Out of those 4.6 million users, the set of heuristics caused 99.9% to be labeled as being associated with "non-fraud" legitimate activity, and 0.1% to be labeled as being associated with "fraud" activity.

Because the heuristics applied by the heuristic labeler 124 may only be satisfied by a portion of the historical media usage data 114, the heuristic labeler 124 may leave other portions of the of the historical media usage data 114 unlabeled as discussed above. However, one or more initial media fraud detection models 126 may be trained on the labels produced by the heuristic labeler 124. After the initial media fraud detection models 126 have been trained on heuristically-determined labels generated by the heuristic labeler 124, the trained initial fraud detection models 126 may evaluate a remaining portion of the historical media usage data 114 to generate corresponding predictions indicating whether additional user activity samples are likely to be fraudulent. The labeled training data 122 may accordingly include labels corresponding to predictions made by the initial media fraud detection models 126, instead of or in addition to the heuristically-determined labels generated by the heuristic labeler 124.

In some examples, the one or more initial media fraud detection models 126 may be trained via unsupervised machine learning techniques. In these examples, the initial media fraud detection models 126 may be anomaly detection classification models, such as Auto Encoders, Variational Auto Encoders (VAEs), and/or other anomaly detection classification models. Such anomaly detection models may be trained to predict and identify outlier samples relative to inlier samples, such that identified outlier samples can be assumed to be samples of fraudulent user activity or potentially fraudulent user activity.

As discussed above, in some situations the labeled training data 122 generated by the heuristic labeler 124 may have a large class of "non-fraud" samples and a relatively small class of "fraud" samples. Due to the relative scarcity of "fraud" samples, the initial media fraud detection models 126 may be trained as "one-class" anomaly detection models on the much larger class of "non-fraud" samples within the labeled training data 122 generated by the heuristic labeler 124. As a non-limiting example, in tests described above in which data associated with 4.6 million users was labeled by the heuristic labeler 124, and 99.9% of the heuristically-determined labels were "non-fraud" and only 0.1% of the heuristically-determined labels were "fraud," initial media fraud detection models 126 such as were trained as one-class anomaly detection models using unsupervised machine learning to detect outliers, and thus samples of likely fraudulent activity, within the much larger set of "non-fraud" samples initially determined by heuristics alone. During training via such unsupervised machine learning techniques, such one-class anomaly detection models may also be trained using mean squared error (MSE) upon reconstruction to classify whether individual samples in the set of "non-fraud" samples are likely to be associated with fraudulent behavior or non-fraudulent behavior.

After such anomaly detection models have been trained via unsupervised machine learning techniques on a first training set of data, such as labeled training data 122 generated by the heuristic labeler 124, the anomaly detection models may be used to evaluate other historical media usage data 114 the heuristic labeler 124 has not labeled. As a non-limiting example, if the heuristic labeler 124 was able to label a first set of 4.6 million samples and did not label a second set of 6.7 million samples, the trained anomaly detection models may generate predictions indicating whether individual samples in the second set of 6.7 million samples are likely to be associated with fraudulent user activity, such that corresponding "fraud" and "non-fraud" labels for some or all of the remaining 6.7 million samples may be included in the labeled training data 122.

In other examples, the initial media fraud detection models 126 may be trained via semi-supervised machine learning techniques, for instance based at least in part on the set of labeled training data 122 generated by the heuristic labeler 124. In these examples, the initial media fraud detection models 126 may be based on boosted tree classifier algorithms, such as LightGBM models, XGBoost models, or CatBoost models, or may be based on deep learning techniques, non-linear techniques, and/or other machine learning techniques. In these examples, the initial media fraud detection models 126 may be trained on both "fraud" and "non-fraud" samples identified by the heuristically-determined labels generated by the heuristic labeler 124. For example, the initial media fraud detection models 126 may be trained to identify features, and/or patterns or combinations of features, of user activity samples that are predictive of the labels that were applied by the heuristic labeler 124. The initial media fraud detection models 126 may continue to be trained, for example by adjusting weights, hyperparameters, and/or other variables, until the initial media fraud detection models 126 are able to generate predictions that reproduce, with at least a threshold degree of accuracy, the labels that were applied by the heuristic labeler 124.

After one or more initial media fraud detection models 126 have been trained via semi-supervised machine learning techniques on a first training set of data, such as labeled training data 122 generated by the heuristic labeler 124, the trained initial media fraud detection models 126 may be used to evaluate other historical media usage data 114 the heuristic labeler 124 has not labeled. As a non-limiting example, if the heuristic labeler 124 was able to label a first set of 4.6 million samples and did not label a second set of 6.7 million samples, a trained LightGBM model may generate predictions indicating whether individual samples in the second set of 6.7 million samples are likely to be associated with fraudulent user activity, such that corresponding "fraud" and "non-fraud" labels for some or all of the remaining 6.7 million samples may be included in the labeled training data 122.

In some examples, the preprocessing elements 118 may include multiple types of initial media fraud detection models 126. As a non-limiting example, the initial media fraud detection models 126 may include one or more anomaly detection models, such as Auto Encoders or VAEs, and one or more gradient boosted models, such as LightGBM models, XGBoost models, or CatBoost models. In this example, the anomaly detection models may be trained on a first set of labeled training data 122 generated via the heuristic labeler 124 based on a first portion of historical media usage data 114, and may thereafter generate predictions associated with a second portion of the historical media usage data 114. The gradient boosted models may then be trained on either or both sets of labeled training data 122 generated by the heuristic labeler 124 and the anomaly detection models, and may thereafter generate predictions associated with a third portion of the historical media usage data 114 or a subsequent set of historical media usage data 114.

In some examples, labels produced by the heuristic labeler 124 and/or the initial media fraud detection models 126 may be audited and/or evaluated by experts 128. For example, one or more experts 128 who have access to the historical media usage data 114, and/or other data associated with the media service 110, may perform investigations to confirm or deny labels in the labeled training data 122 that were determined by the heuristic labeler 124 and/or the initial media fraud detection models 126. For instance, if a particular user 112 has been labeled as being associated with suspected fraudulent activity because historical media usage data 114 associated with the user 112 satisfied conditions of at least one "fraud" heuristic applied by the heuristic labeler 124, or due to a prediction by a trained initial media fraud detection model 126, a human expert 128 may be tasked to perform a corresponding investigation into that particular user's activity. The human expert 128 may evaluate historical media usage data 114 and/or other data associated with the particular user 112 to determine whether the human expert 128 agrees that the particular user 112 was engaging in fraudulent activity, or whether the human expert 128 determines that the particular user 112 does not appear to have been engaging in fraudulent activity. If the human expert 128 does not agree with a label that had been added to the labeled training data 122 by the heuristic labeler 124 or by an initial media fraud detection model 126, the human expert 128 may provide input that changes the label in the labeled training data 122.

Feedback or input from experts 128 may also be used to train or retrain the initial media fraud detection models 126. For example, if an initial media fraud detection model 126 frequently predicts that a certain type of user 112 is likely to be engaging in fraudulent activity, but experts 128 provide feedback indicating that those users 112 are not actually engaging in fraudulent activity, the initial media fraud detection model 126 may be retrained based at least in part on the expert feedback such that the initial media fraud detection model 126 becomes less likely to subsequently predict that similar users 112 are engaging in fraudulent activity.

As discussed above, the preprocessing elements 118 that generate the labeled training data 122 may include the heuristic labeler 124, one or more initial media fraud detection models 126, and/or experts 128. In some examples, the preprocessing elements 118 may also include a feature selector 130 that determines which features of historical media usage data 114 are to be evaluated by other preprocessing elements 118 and/or are to be included in the labeled training data 122 produced by the preprocessing elements 118.

The historical media usage data 114 may indicate multiple types of information about users 112 and/or corresponding user activity. The feature selector 130 may be configured via user input and/or via automated techniques to identify particular types of information about users 112 and/or user activity within the historical media usage data 114 that may be most relevant to identifying fraudulent activity. Accordingly, the feature selector 130 may indicate that those types of information are features that should be evaluated by preprocessing elements 118 such as the heuristic labeler 124, the initial media fraud detection models 126, and/or experts 128, and/or should be included in labeled training data 122.

For instance, if the media service 110 is a music streaming service, the feature selector 130 may identify a set of features that may be relevant to identifying fraudulent activity on the music streaming service. As a non-limiting example, the feature selector 130 may identify an initial set of tens, hundreds, or thousands of relevant features that may be evaluated by preprocessing elements 118 and/or included in labeled training data 122 for a user 112, such as features indicating a user or account type, an age of the user's account, user device identifiers and/or types used by the user 112, a number of streams per artist by the user 112, a total listening duration per artist by the user 112, a rate of song completions per artist by the user 112, instances of one or more types of user interactions with the media service such as interactions to pause, skip, or resume playback, overall numbers of tracks, albums, playlists, and/or other media content items completed by the user 112, tags indicating types or categories of individual tracks, albums, playlists, and/or other media content items accessed by the user 112, overall listening time by the user 112, sources of media content selections by the user 112 indicating whether the user 112 accessed media content items via searches, links, playlists, or other methods, and/or other information.

The feature selector 130 and/or other elements of the media fraud detection system 102 may determine statistics associated with identified features, such as minimum values, maximum values, average values, standard deviations, and/or other statistics, such that values of features for individual users 112 may be compared against corresponding statistics. Values of features associated with users 112 may also be encoded into feature vectors, such that the feature vectors may be evaluated by the preprocessing elements 118 and/or used to generate corresponding labeled samples in the labeled training data 122.

In some examples, the feature selector 130 may also reduce the number of features used by the preprocessing elements 118 and/or that are included in the labeled training data 122 over time. For example, after an initial media fraud detection model 126 has been trained and begins generating predictions that are used as labels in the labeled training data 122, the feature selector 130 may be configured to determine relative importance levels of the different features to the predictions generated by the initial media fraud detection model 126. The feature selector 130 may use models or techniques such as XGBoost and SHAP (SHapley Additive exPlanations) to determine important values associated with respective features. The feature selector 130 may determine to cease consideration and evaluation of features that have relatively low feature importance values, and to continue evaluating features with higher feature importance values that are more likely to be relevant to fraud determinations. Accordingly, the feature selector 130 may perform feature reduction operations to reduce the overall number of features that are evaluated by preprocessing elements 118 and/or included in labeled training data 122. Such reduction in the number of features may reduce an overall amount of data processed by the preprocessing elements 118 and other elements of the media fraud detection system 102, thereby increasing efficiency of the media fraud detection system 102.

In some examples, the preprocessing elements 118 may omit one or more of the heuristic labeler 124, the initial media fraud detection models 126, and/or the experts 128. As an example, after one or more initial media fraud detection models 126 have been trained based on some heuristically-determined labels generated by the heuristic labeler 124, the trained initial media fraud detection models 126 may operate on subsequent sets of historical media usage data 114 to generate corresponding labeled training data 122 without the heuristic labeler 124 also operating on the subsequent sets of historical media usage data 114. As another example, if training and/or re-training of one or more initial media fraud detection models 126 leads to identification of a set of features that experts 128 agree reliably identify fraudulent users 112 and/or fraudulent user activity, or experts 128 use other methods to identify such a set of features, the experts 128 may begin searching for those features within historical media usage data 114 in order to identify samples of fraudulent activity that may be included in labeled training data 122 without use of the heuristic labeler 124 or the initial media fraud detection models 126.

As a non-limiting example, while the feature selector 130 may cause one or more initial media fraud detection models 126 to evaluate multiple hundreds of features, experts 128 may determine to evaluate a smaller set of features, such as a set of 83 features. In some examples, the historical media usage data 114 may be divided into weekly feature sets that include samples having the 83 features. For each weekly feature set, experts 128 may evaluate the smaller set of 83 features to identify samples of suspected fraud to be labeled as "fraud" samples in the labeled training data 122, instead of or in addition to using the heuristic labeler 124 and/or the initial media fraud detection models 126 to generate the labeled training data 122.

In this example, the set of 83 features may be divided into four high-level semantic groups such as user information about users 112, user device information about user devices used by users 112, content selection sources used by users 112 to select songs, albums, or other media content items, and user streaming patterns associated with users 112. The user streaming patterns may be based on hourly aggregated stream events within a weekly 7-day window. Different user streaming patterns may also be delineated based on a variance in stream counts over time. For example, automated bots employed by users 112 may demonstrate continual or consistent streaming behavior with low variance, which may be relatively likely to be associated with fraudulent activity. In contrast, human users 112 may demonstrate more varied streaming behavior with higher variances, and may thus be less likely to be associated with fraudulent activity. Accordingly, experts 128 may choose to evaluate such features associated with user streaming patterns, as those features may be one of the top signals of fraudulent activity that can be determined by experts 128 during manual investigations.

The media fraud detection system 102 may determine a variance Var(S) in a subset (S) of data points $X_{h,d}$, where h denotes the hour and d denotes the day, using the following Equation 1:

$$\text{Var}(S) = \frac{1}{n-1} \sum_{x \in S} (x - \mu(S))^2, \quad (1)$$

where S is a subset of data points for which the variance is to be calculated, n is the number of data points in the subset, and μ(S) is a mean of the data points in the subset that is calculated using the following Equation 2:

$$\mu(S) = \frac{1}{n} \sum_{x \in S} x. \quad (2)$$

Specific variances may be calculated on an hourly basis, on a daily basis, and/or overall. As an example, for each hour h, a variance may be calculated using Equation 1 for a subset $S_h$, where $S_h = \{X_{h,1}, X_{h,2}, \ldots, X_{h,7}\}$, with n=7 for the number of days in a week. As another example, for each day d, a variance may be calculated using Equation 1 for a subset $S_d$, where $S_d = \{X_{1,d}, X_{2,d}, \ldots, X_{24,d}\}$, with n=24 for the number of hours in a day. As another example, a variance for an entire data set representing a particular week may be calculated using Equation 1 for a subset S, where $S = \{X_{h,d} | h=1, \ldots, 24; d=1, \ldots, 7\}$, with n=168 to represent the total number of data points across all hours and days during the week.

Although such variance values may be evaluated by experts 128 as discussed above, the media fraud detection system 102 may also determine variance values associated with samples of user activity in the historical media usage data 114 so that the variance values may be evaluated by the heuristic labeler 124 and/or one or more initial media fraud detection models 126. For example, some heuristics applied by the heuristic labeler 124 to identify likely fraud activity and/or likely non-fraud activity may be based on variance values associated with user streaming behavior. As another example, the initial media fraud detection models 126 may be trained to predict likely fraudulent activity based on variance values associated with user streaming behavior.

Overall, as discussed above, at least one of the preprocessing elements 118 may evaluate unlabeled historical media usage data 114 to generate corresponding labeled training data 122 that includes binary labels identifying samples of suspected fraudulent activity and samples of suspected non-fraudulent activity. However, although instances of fraudulent activity may negatively impact the media service 110 as discussed above, the vast majority of users 112 may not be engaging in fraudulent activity such that the amount of fraudulent activity on the media service 110 may be small relative to the amount of legitimate non-fraudulent activity on the media service 110. Accordingly, the labeled training data 122 generated by the preprocessing elements 118 based on the historical media usage data 114 may be relatively unbalanced, and may include a large number of samples of non-fraudulent activity and a relatively small number of samples of fraudulent activity. Although a model trained on such unbalanced labeled training data 122 via supervised machine learning may be relatively accurate, such a model may be unlikely detect some forms of fraudulent user activity due to the relative scarcity of labeled fraud samples in the unbalanced labeled training data 122.

As an example, a gradient boosting model may be trained with a focus on correcting errors in predictions. Accordingly, because there may be many more samples of the majority non-fraud class than the minority fraud class in the unbalanced labeled training data 122, training a gradient boosting model on the unbalanced labeled training data 122 may cause the gradient boosting model to disproportionately focus on reducing errors associated with the majority non-fraud class, and in turn underfit the minority fraud class because the minority fraud class has a weaker signal than the majority non-fraud class in the unbalanced labeled training data 122.

Accordingly, to increase the accuracy of the media fraud detection model 104 that will operate on subsequent new media usage data 108, for instance in real-time as new user activity occurs, the media fraud detection model 104 may be trained on balanced training data 116 instead of the unbalanced labeled training data 122. The balanced training data 116 may be derived from the labeled training data 122 by the training data balancer 120. The training data balancer 120 may derive the balanced training data 116 from the unbalanced labeled training data 122 by undersampling the non-fraud samples indicated by the labeled training data 122. Accordingly, although the labeled training data 122 may have a large amount of non-fraud samples and a small amount of fraud samples, the balanced training data 116 may have a reduced number of non-fraud samples that is equal to the number of fraud samples, or is at least closer to the number of fraud samples.

As a non-limiting example, if the labeled training data 122 includes one thousand fraud samples and one million non-fraud samples, the training data balancer 120 may undersample the non-fraud samples by selecting one thousand of the non-fraud samples to include in the balanced training data 116. The training data balancer 120 may include the one thousand fraud samples indicated by the labeled training data 122 in the balanced training data 116. The training data balancer 120 may also include the undersampled one thousand non-fraud samples, selected by the training data balancer 120 from the labeled training data 122, in the balanced training data 116. Accordingly, in this example, the balanced training data 116 may have an equal number of fraud samples and non-fraud samples. In other examples, the balanced training data 116 may have an unequal number of fraud samples and non-fraud samples, but the numbers of fraud samples and non-fraud samples in the balanced training data 116 may be closer than in the users 112. For instance, if the labeled training data 122 includes one thousand fraud samples and one million non-fraud samples, the training data balancer 120 may undersample the non-fraud samples by selecting three thousand non-fraud samples to include in the balanced training data 116, such that the balanced training data 116 includes a collection of one thousand fraud samples and three thousand non-fraud samples that is more balanced than the collection of one thousand fraud samples and one million non-fraud samples included in the labeled training data 122.

In some examples, the training data balancer 120 may undersample the non-fraud samples indicated by the labeled training data 122 by randomly selecting a set of the non-fraud samples and including the randomly-selected non-fraud samples in the balanced training data 116. In other examples, the training data balancer 120 may use a clustering method to select a set of representative non-fraud samples from the non-fraud samples indicated by the labeled training data 122, for instance based on centroids of identified clusters as discussed further below with respect to FIG. 2, and may include the selected set of representative non-fraud samples in the balanced training data 116.

Figure 2:
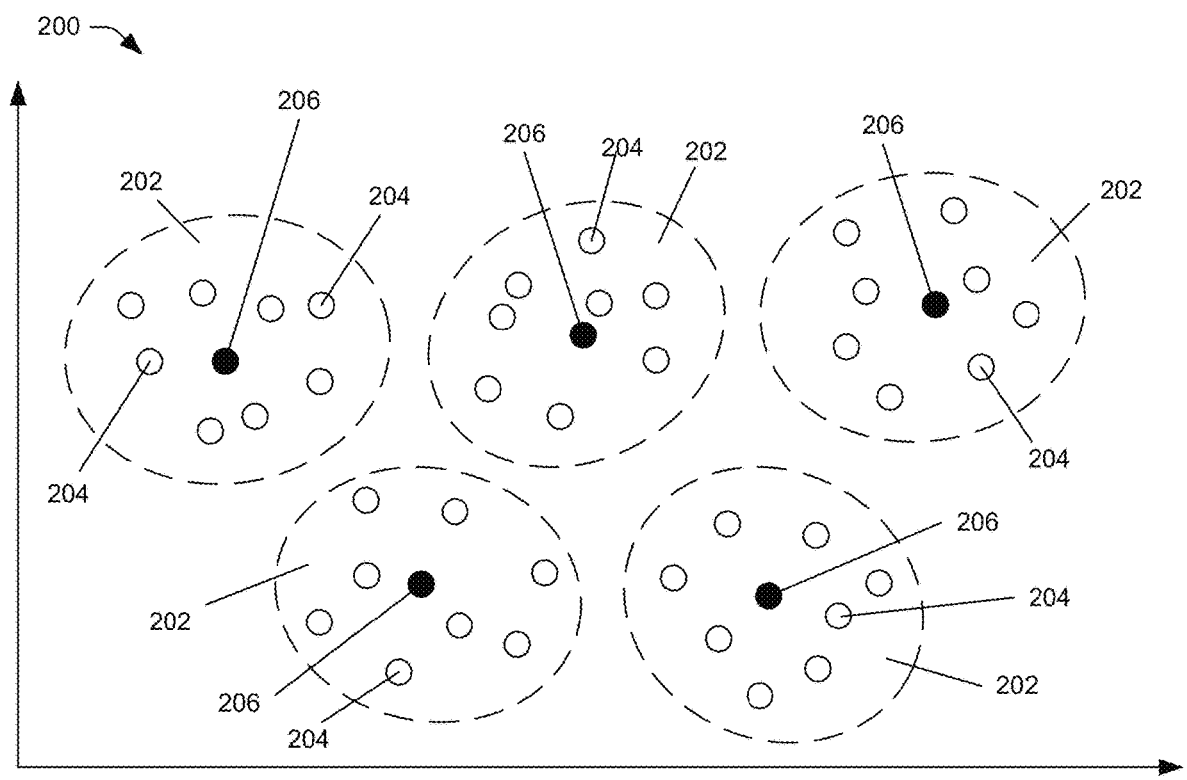
FIG. 2 shows an example of a training data balancer using a clustering method to select a subset of representative non-fraud samples from a larger set of non-fraud samples indicated by unbalanced labeled training data.

FIG. 2 shows an example 200 of the training data balancer 120 using a clustering method to select a subset of representative non-fraud samples from a larger set of non-fraud samples indicated by unbalanced labeled training data 122. The training data balancer 120 may use k-means clustering, density-based clustering, centroid-based clustering, spectral clustering, distribution-based clustering, hierarchical clustering, agglomerative clustering, divisive clustering, and/or other types of clustering to identify clusters 202 of similar non-fraud samples 204 indicated by the labeled training data 122. As an example, the training data balancer 120 may use k-means clustering to group non-fraud samples 204 from the labeled training data 122 into a defined number (k) of clusters 202, such that different clusters 202 include different sets of non-fraud samples 204 that may be associated with corresponding types or classes of non-fraudulent user activity.

In some examples such clustering techniques may use an unsupervised machine learning model and/or other techniques to identify patterns within features of the set of non-fraud samples 204 to identify clusters 202 of similar non-fraud samples. For instance, the training data balancer 120 may identify which types of features, and/or values of features, associated with non-fraud samples 204 are indicative of similar types of user activity.

As an example, the training data balancer 120 may map values of various features associated with corresponding non-fraud samples 204 into a corresponding multi-dimensional feature space that has dimensions associated with the various features, as shown in FIG. 2. Although the non-fraud samples 204 may be associated with many features as discussed above, such as tens, hundreds, or thousands of features, FIG. 2 is a representation of spatial positions of non-fraud samples 204 within a reduced two-dimensional feature space. Based on the spatial positions of the non-fraud samples 204 in the multi-dimensional feature space, the training data balancer 120 may identify spatial clusters 202 of non-fraud samples 204.

For instance, a particular cluster 202 may include a set of non-fraud samples 204 that are within a threshold distance from one another in the multi-dimensional feature space. The particular cluster 202 may accordingly encompass non-fraud samples 204 associated with relatively similar instances of user activity, and may thereby be associated with a corresponding type or class of user activity. Similarly, other clusters 202 may encompass non-fraud samples 204 that are associated with other types or classes of user activity.

The training data balancer 120 may also determine a spatial position of a center point, known as a centroid 206, of each cluster 202, for example by averaging or otherwise processing the values of features associated with the different non-fraud samples 204 of the cluster 202 in corresponding dimensions of the feature space. The non-fraud sample 204 positioned at or nearest to the spatial position of the centroid 206 of each cluster 202 may be the most representative non-fraud sample of that cluster 202. For example, the centroids 206 may optimize within-cluster sum of squares (WCSS), which may be expressed via the following Equation 3:

$$WCSS = \sum_{k=1}^{K} \sum_{x \in C_k} \|x - \mu_k\|^2, \quad (3)$$

where $\|x-\mu_k\|^2$ represents a Euclidean distance between a point x and a centroid $\mu_k$.

The training data balancer 120 may accordingly use k-means clustering or other clustering techniques to group the non-fraud samples 204 indicated by the labeled training data 122 into different clusters 202 of relatively similar non-fraud samples 204. The training data balancer 120 may select non-fraud samples 204 that are at or nearest to the centroid 206 of each cluster 202, which may be the most representative non-fraud samples 204 within those clusters 202. Accordingly, by using centroids 206 to select non-fraud samples 204 from each cluster 202, the training data balancer 120 may select a subset of representative non-fraud samples 204 from the labeled training data 122, such that the selected subset includes non-fraud samples 204 that maintain and indicate characteristics of the overall distribution of the larger set of non-fraud samples 204 indicated by the original unbalanced labeled training data 122. The training data balancer 120 may include the subset of representative non-fraud samples 204, selected based on centroids 206 of the clusters 202, in the balanced training data 116.

The training data balancer 120 may group non-fraud samples 204 from the labeled training data 122 into a number of different clusters 202 that is equal to the number of fraud samples in the labeled training data 122, or that is lower than the number of non-fraud samples in the labeled training data 122. Accordingly, the training data balancer 120 may select non-fraud samples 204 at or nearest to the centroids 206 of each of the clusters 202, such that the number of selected non-fraud samples 204 to be included in the balanced training data 116 is equal to the number of fraud samples in the labeled training data 122, or is lower than the number of non-fraud samples in the labeled training data 122.

As a non-limiting example, if the labeled training data 122 includes one thousand fraud samples and one million non-fraud samples 204, the training data balancer 120 may divide the million non-fraud samples 204 into one thousand clusters 202, where non-fraud samples 204 within each of the clusters 202 are relatively similar to each other based on feature values. In this example, the training data balancer 120 may select a non-fraud sample 204 at or nearest to the centroid 206 of each of the one thousand clusters 202, such that the training data balancer 120 selects a set of one thousand non-fraud samples 204 to be included in the balanced training data 116 out of the larger set of one million non-fraud samples indicated by the unbalanced labeled training data 122.

Overall, although the labeled training data 122 may be unbalanced and have a majority class of non-fraud samples and a minority class of fraud samples, the training data balancer 120 may use clustering techniques to undersample from the major class of non-fraud samples within the labeled training data 122 based on centroids 206 of clusters 202, such that the balanced training data 116 includes equal or more balanced numbers of fraud samples and non-fraud samples. Such clustering techniques may minimize information loss, because non-fraud samples 204 selected based on centroids 206 of clusters 202 may capture mean characteristics of those clusters 202, such that notable features and characteristics of the overall data distribution within the larger set of non-fraud samples indicated by the unbalanced labeled training data 122 may be preserved in the selected set of non-fraud samples that is included in the balanced training data 116. The clustering techniques may also lead to more efficient data representations in the balanced training data 116 relative to the labeled training data 122, because selection of a representative non-fraud sample 204 from a cluster 202 based on the centroid 206 of the cluster 202 may condense all of the non-fraud samples 204 in that cluster 202 into the single selected non-fraud sample 204, thereby maintaining feature space integrity while reducing the overall number of non-fraud samples 204 included in the balanced training data 116.

The training data balancer 120 may adjust the number (k) of clusters 202 used in the clustering techniques described herein, for instance based on performance metrics and/to cause the number of non-fraud samples 204 included in the balanced training data 116 to be equal to a number of identified fraud samples or to be closer to the number of identified fraud samples than the original number of non-fraud samples 204 in the labeled training data 122. The training data balancer 120 may accordingly adjust the number (k) of clusters 202 to control data granularity and/or the balance between the fraud samples and non-fraud samples in the balanced training data 116. Although random selection of non-fraud samples 204 may be used instead of, or in addition to selection of non-fraud samples 204 based on clustering techniques, the use of clustering techniques to select non-fraud samples 204 based on centroids 206 may enhance model generalization relative to random selection, and/or may reduce risks of overfitting.

Returning to FIG. 1, after the training data balancer 120 generates the balanced training data 116 based on the unbalanced labeled training data 122, the media fraud detection model 104 may be trained on the balanced training data 116 using supervised machine learning techniques. For example, based on labels in the balanced training data 116 that indicate whether user activity samples are associated with fraud or are not associated with fraud, the media fraud detection system 102 may train the media fraud detection model 104 by evaluating features of the samples and determining which features, values of features, and/or combinations of features are most predictive of the labels of the samples indicated by the balanced training data 116. Supervised learning algorithms can, for example, determine weights for different features and/or different combinations of features indicated by the balanced training data 116 that optimize prediction of the labels of the samples, and/or may determine weights for different features such that the media fraud detection model 104 may prioritize and/or weight the features in relative relation to each other. The media fraud detection model 104 may continue to be trained, for example by adjusting weights, hyperparameters, and/or other variables, until the media fraud detection model 104 is able to generate predictions that reproduce the labels indicated by the balanced training data 116 with at least a threshold degree of accuracy.

As discussed above, the media fraud detection model 104 may be a machine learning model, such as a gradient boosting model, deep learning model, non-linear model, or other type of model. Because the balanced training data 116 may include a more balanced set of fraud samples and non-fraud samples than the unbalanced labeled training data 122, the media fraud detection model 104 trained using the balanced training data 116 may be more accurate at generating fraud predictions 106 than if the media fraud detection model 104 had been trained directly on the unbalanced labeled training data 122.

For example, the media fraud detection model 104 may be a LightGBM model or other gradient boosted tree or gradient boosted machine model. Although such a gradient boosting model may be trained with a focus on correcting errors in predictions and accordingly focus on reducing errors associated with a majority class such that the training may risk underfitting for a minority class, because the balanced training data 116 includes equal numbers of fraud samples and non-fraud samples or has an undersampled number of majority class non-fraud samples that is closer to a number of minority fraud samples, such risks due to a class imbalance may be reduced or eliminated. Accordingly, the gradient boosting model may be trained on the balanced training data 116, instead of the unbalanced labeled training data 122, so that the gradient boosting model may be more accurately trained to predict instances of fraud in media usage data 108.

As a non-limiting example, during tests in which a first LightGBM model was trained using semi-supervised learning based on heuristically-determined labeled training data 122, the first LightGBM model had a precision rate of approximately 80%. A second LightGBM model was trained based on a set of unbalanced labeled training data 122 that included labels generated at least in part by experts 128, and the second LightGBM model had a precision rate of approximately 95%. However, when a third LightGBM model was trained based on a set of balanced training data 116 instead of unbalanced labeled training data 122, the third LightGBM model had a higher precision rate of over 95%, and was able to flag more instances and/or more types of fraudulent activity than the second LightGBM model.

After the media fraud detection model 104 has been trained on balanced training data 116 derived from historical media usage data 114 by one or more preprocessing elements 118 and the training data balancer 120, the media fraud detection model 104 may be deployed in the media fraud detection system 102 to generate fraud predictions 106 based on new media usage data 108, such as media usage data 108 associated with current or recent user activity. For example, after the media fraud detection model 104 has been trained on balanced training data 116 and has determined a pattern of user activity features that is predictive of fraudulent user activity, the media fraud detection model 104 may generate a fraud prediction 106, substantially in real time, indicating that a current instance of user activity is likely fraudulent if media usage data 108 about the current instance of user activity matches the pattern of user activity features associated with fraudulent activity.

The fraud predictions 106 generated by the media fraud detection model 104 based on media usage data 108 may be provided to one or more elements of the media service 110. Accordingly, if the fraud predictions 106 identifies instances of fraudulent activity, the media service 110 may take one or more actions to account for, and/or to mitigate impacts of, the fraudulent user activity identified by the fraud predictions 106.

As an example, the media fraud detection model 104 may generate a fraud prediction 106 indicating that a particular user 112 is likely engaging in fraudulent activity in an attempt to artificially boost play counts of one or more songs uploaded to the media service 110 by that particular user 112. In this example, the media service 110 may add the user 112 to a blacklist of fraudulent users, may block the user 112 from accessing the media service 110, may block the user 112 from uploading additional media content to the media service 110, may send a warning to the user 112, and/or may perform other responsive actions. The media service 110 may also, or alternately, avoid incrementing play counts of the user's songs in media usage data 108, and/or retroactively decrement such play counts in media usage data 108 and/or historical media usage data 114, in response to the user's fraudulent activity. Accordingly, the media service 110 may effectively ignore or discount the user's fraudulent activity within play counts and/or other metrics tracked in media usage data 108 and/or historical media usage data 114. By ignoring or discounting the user's fraudulent activity within media usage data 108 and/or historical media usage data 114 based on corresponding fraud predictions 106, the media service 110 may avoid becoming more likely to recommend the user's songs to other users 112 due to the user's fraudulent activity, may avoid boosting the positions of the user's songs or albums on streaming charts that are used internally by the media service 110 and/or presented by the media service 110 to other users 112 due to the user's fraudulent activity, may avoid increasing royalty amounts that will be paid to the user 112 due to the user's fraudulent activity, may avoid decreasing royalty amounts that will be paid to other users 112 due to the user's fraudulent activity, and/or may eliminate or reduce other negative impacts of the user's fraudulent activity.

In some examples, the media fraud detection model 104 may be configured to determine and indicate confidence values associated with fraud predictions 106. As a non-limiting example, a first fraud prediction 106 generated for a first instance of user activity may indicate that the first instance of user activity is 90% likely to be fraudulent, while a second fraud prediction 106 generated for a second instance of user activity may indicate that the second instance of user activity is only 60% likely to be fraudulent.

In these examples, the media service 110 may perform different actions in response to fraud predictions 106 that have different confidence levels, and/or may not perform a responsive action unless the confidence level of a fraud prediction 106 meets or exceeds a threshold. As an example, if a fraud prediction 106 indicates that the user's play of a song has a 90% chance of being part of fraudulent activity by the user 112, and a threshold for ignoring that song play within the media usage data 108 is set to an 80% confidence level, the media service 110 may avoid incrementing the song's play count in the media usage data 108 due to the user's activity. However, if the fraud prediction 106 instead indicates that the user's play of the song has only a 60% chance of being part of fraudulent activity by the user 112, and a threshold for ignoring that song play within the media usage data 108 is set to an 80% confidence level, the media service 110 may increment the song's play count in the media usage data 108 due to the user's activity. As another example, if a fraud prediction 106 indicates that a user's play of a song has a 95% chance of being part of fraudulent activity by the user 112, the media service 110 may block the user 112 or add the user 112 to a blacklist of known fraudulent users 112. However, if the fraud prediction 106 indicates that the user's play of the song has a 70% chance of being part of fraudulent activity by the user 112, the media service 110 may send a warning notification to the user 112 or perform another response action that may be less punitive than blocking the user 112 or adding the user 112 to a blacklist of known fraudulent users 112.

In some examples, the media fraud detection model 104, one or more initial media fraud detection models 126, and/or other elements may be retrained periodically, for instance based on new sets of historical media usage data 114, feedback from experts 128 indicating whether fraud predictions 106 generated by the media fraud detection model 104 or the initial media fraud detection models 126 over time are accurate, and/or other data. For example, over time some users 112 may begin engaging in new types of fraudulent activity, which the initial media fraud detection models 126 and/or the media fraud detection model 104 may not yet have been trained to detect. However, samples of activity by such users 112 may be captured in new sets of historical media usage data 114 that are collected over time. One or more initial media fraud detection models 126 may be re-trained to predict the new types of fraudulent activity based on the new sets of historical media usage data 114, in some examples in addition to older sets of historical media usage data 114. Similarly, the heuristic labeler 124 may be configured with new heuristics designed to identify instances of the new types of fraudulent activity, and/or experts 128 may determine how to identify instances of the new types of fraudulent activity. Accordingly, the preprocessing elements 118 may be retrained and/or adjusted to generate new sets of labeled training data 122 that indicate instances of the new types of fraudulent activity, in addition to instances of older types of fraudulent activity. The training data balancer 120 may derive corresponding new sets of balanced training data 116 from the new sets of labeled training data 122 that include samples of the new types of fraudulent activity. Accordingly, the media fraud detection model 104 may be retrained on the new sets of balanced training data 116, in some examples in addition to older sets of balanced training data 116, such that that the media fraud detection model 104 may be adjusted over time to identify instances of the new types of fraudulent activity.

As another example, experts 128 or other entities may periodically analyze and audit fraud predictions 106 generated by the media fraud detection model 104, and may provide feedback indicating whether or not the fraud predictions 106 are accurate. For example, if a fraud predictions 106 generated by the media fraud detection model 104 indicates that a particular user 112 is suspected of engaging in fraudulent activity, but an investigation by an expert 128 determines that the particular user 112 was not actually engaging in fraudulent activity, the media fraud detection model 104 may be retrained based at least in part on feedback from the expert 128 such that the media fraud detection model 104 may be less likely to produce similar inaccurate fraud predictions 106 in the future. Accordingly, as new historical media usage data 114 and/or feedback from experts 128 is collected over time, the media fraud detection model 104 may be periodically or occasionally retrained such that the media fraud detection model 104 becomes more accurate over time.

In some examples, borderline fraud predictions 106 generated by the media fraud detection model 104, and/or borderline labels of user activity in the labeled training data 122 and/or the balanced training data 116, may be flagged for review by experts 128 or other entities. A borderline fraud prediction 106 may be a prediction of fraudulent activity or a prediction of non-fraudulent activity that has a relatively low confidence level, such as a confidence level below 70% or other threshold confidence level, or that disagrees with a parallel fraud determination made by an expert 128 or other entity. A borderline label of user activity in the labeled training data 122 and/or the balanced training data 116 may indicate fraud or non-fraud based on a determination by one of the preprocessing elements 118, but may disagree with a corresponding fraud determination or label for the same instance of user activity determined by one or more other preprocessing elements 118. Accordingly, one or more experts 128 or other entities may review investigate user activity corresponding to borderline fraud predictions 106 and/or borderline labels, to confirm whether or not the borderline fraud prediction 106 and/or borderline labels were accurate. The media fraud detection model 104 may be retrained based on such feedback on borderline fraud predictions 106 and/or borderline labels, for instance to increase the confidence levels of future fraud predictions 106.

Overall, by using the media fraud detection model 104 to generate fraud predictions 106 based on media usage data 108, for instance in real-time or near real-time based on media usage data 108 associated with current or recent user activity, the media service 110 may more quickly and more accurately detect and mitigate fraudulent activity by users 112. Such detection and mitigation of fraudulent activity may cause metrics tracked by the media service 110 to be more accurate, for instance because identified fraudulent activity may be ignored or accounted for in the metrics. Additionally, because the media service 110 may have more accurate metrics due to the fraud predictions 106, and may perform operations such as determining charts, recommendations, royalty amounts, and/or other elements based on more accurate metrics that are not artificially modified due to fraudulent activity, users 112 of the media service 110 may have more trust and confidence in the operations of the media service 110.

Figure 3:
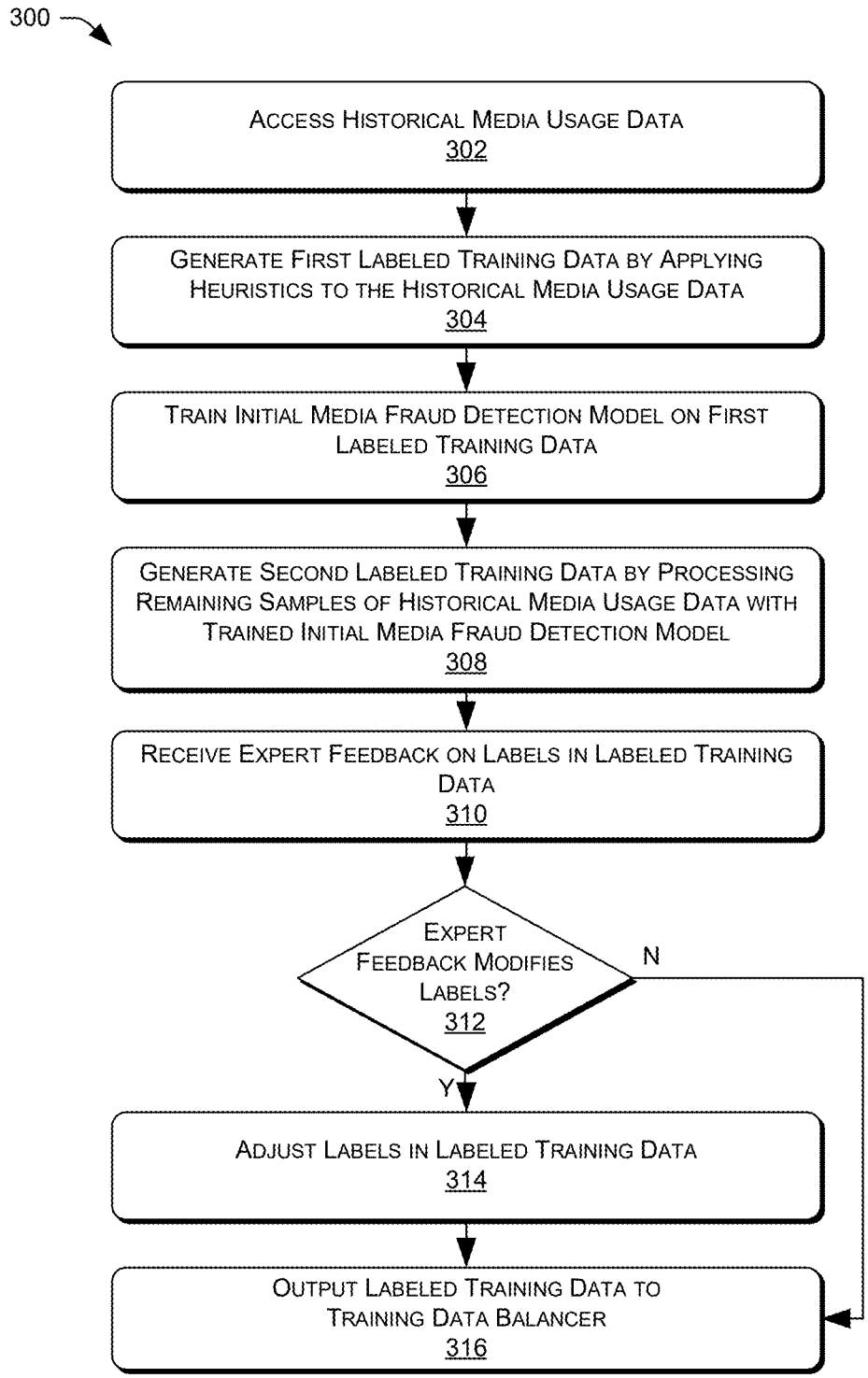
FIG. 3 is a flow diagram of an illustrative process for generating labeled training data.

FIG. 3 is a flow diagram of an illustrative process 300 for generating labeled training data 122. Process 300 is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

At block 302, the preprocessing elements 118 of the media fraud detection system 102 may access a set of historical media usage data 114. The historical media usage data 114 may indicate attributes of activity on the media service 110 by users 112 over one or more periods of time.

At block 304, the heuristic labeler 124 may generate a first set of labeled training data 122 by applying a set of predefined heuristics to the historical media usage data 114 accessed at block 306. The set of predefined heuristics may define conditions that, if met by characteristics of user activity samples, indicate that the user activity samples are likely to be fraudulent or not fraudulent. Accordingly, the heuristic labeler 124 may apply the set of predefined heuristics to the historical media usage data 114 to identify fraud samples that satisfy conditions of one or more of the fraud heuristics, and to identify non-fraud samples that satisfy conditions of one or more of the non-fraud heuristics. The heuristic labeler 124 may associate fraud labels with the identified fraud samples in the first set of labeled training data 122, and may associate non-fraud labels with the identified non-fraud samples in the first set of labeled training data 122. Because some user activity samples in the historical media usage data 114 may not satisfy predefined conditions of either fraud heuristics or non-fraud heuristics, the heuristic labeler 124 may leave those user activity samples as unlabeled and not include them in the first set of labeled training data 122.

At block 306, the media fraud detection system 102 may train an initial media fraud detection model 126 on the first set of labeled training data 122 generated by the heuristic labeler 124 at block 304. As discussed above, the first set of labeled training data 122 may include heuristically-determined labels identifying fraud samples and non-fraud samples.

In some examples, the initial media fraud detection model 126 may be trained using unsupervised machine learning techniques, based on one class of samples indicated by the first set of labeled training data 122. For instance, the initial media fraud detection model 126 may be an anomaly detection model, such as an Auto Encoder or VAE model, that may be trained via unsupervised machine learning to detect outliers within the set of non-fraud samples in the first set of labeled training data 122 that may actually be associated with fraud.

In other examples, the initial media fraud detection model 126 may be trained using semi-supervised machine learning techniques based on both classes of samples indicated by the first set of labeled training data 122. For instance, the initial media fraud detection model 126 may be a gradient boosted model, such as a LightGBM model, an XGBoost model, or a CatBoost model. The initial media fraud detection model 126 may be trained to identify features, and/or patterns or combinations of features, of user activity samples that are predictive of the fraud labels and the non-fraud labels in the first set of labeled training data 122 generated by the heuristic labeler 124. The initial media fraud detection model 126 may continue to be trained, for example by adjusting weights, hyperparameters, and/or other variables, until the initial media fraud detection model 126 is able to generate predictions that reproduce, with at least a threshold degree of accuracy, the labels that were determined by the heuristic labeler 124.

At block 308, the initial media fraud detection model 126 trained at block 306 may generate a second set of labeled training data 122 by processing remaining samples of the historical media usage data 114 that were not labeled by the heuristic labeler 124 at block 304. For example, as discussed above, some user activity samples in the historical media usage data 114 may not have met conditions of fraud or non-fraud heuristics applied by the heuristic labeler 124 at block 304, such that those user activity samples were not added to the first set of labeled training data 122 and were not used to train the initial media fraud detection models 126 at block 306. However, after the initial media fraud detection model 126 has been trained on the first set of labeled training data 122 at block 306, the trained initial media fraud detection model 126 may evaluate the remaining unlabeled user activity samples in the historical media usage data 114 and generate predictions of whether those unlabeled user activity samples are likely to be associated with fraudulent activity or non-fraudulent activity. Accordingly, the heuristic labeler 124 may use the predictions to apply corresponding fraud labels or non-fraud labels to the remaining user activity samples in the historical media usage data 114, and include such labeled user activity samples in the second set of labeled training data 122.

As discussed above, the heuristic labeler 124 may generate a first set of labeled training data 122 that indicates labels of user activity samples from the historical media usage data 114 that matched conditions of fraud or non-fraud heuristics. The initial media fraud detection model 126 may process the remaining user activity samples in the historical media usage data 114 that failed to meet conditions of fraud or non-fraud heuristics, to generate a second set of labeled training data 122 that indicates predicted labels for the remaining user activity samples. Accordingly, the first set of labeled training data 122 and the second set of labeled training data 122 may together indicate labels for all, or most, of the user activity samples in the historical media usage data 114, such that the first set of labeled training data 122 and the second set of labeled training data 122 may be combined to indicate a full set of labeled training data 122.

At block 310, the media fraud detection system 102 may receive feedback from experts 128 associated with labels in the labeled training data 122 produced at block 304 and/or block 306. For example, experts 128 may be tasked to perform investigations on user activity that is labeled with a fraud label in the labeled training data 122, for instance to confirm or deny whether that user activity was actually fraudulent. The experts 128 may provide feedback indicating whether any of the labels in the labeled training data 122 should be modified, for instance if a fraud label should be changed to a non-fraud label.

Accordingly, the media fraud detection system 102 may determine at block 312 whether any labels in the labeled training data 122 should be modified. If expert feedback does indicate that one or more labels should be modified (Block 312—Yes), the media fraud detection system 102 may adjust those labels in the labeled training data 122 according to the expert feedback at block 314.

After such labels are adjusted at block 314, or if expert feedback is not received that modifies labels (Block 312—No), the media fraud detection system 102 may output the labeled training data 122 produced and/or modified by the preprocessing elements 118 to the training data balancer 120 at block 316. Because most user activity on the media service 110 may be legitimate, the labeled training data 122 generated using the process 300 shown in FIG. 3 may be unbalanced, and include relatively few labeled fraud samples and a relatively large number of non-fraud samples. However, as discussed further below with respect to FIG. 4, the training data balancer 120 may generate a balanced training data 116 by applying undersampling techniques to the non-fraud samples, such that the balanced training data 116 includes a reduced number of non-fraud samples that is equal to, or closer to, the number of fraud samples. The balanced training data 116 may be used to train the media fraud detection model 104, as discussed further below with respect to FIG. 4.

Figure 4:
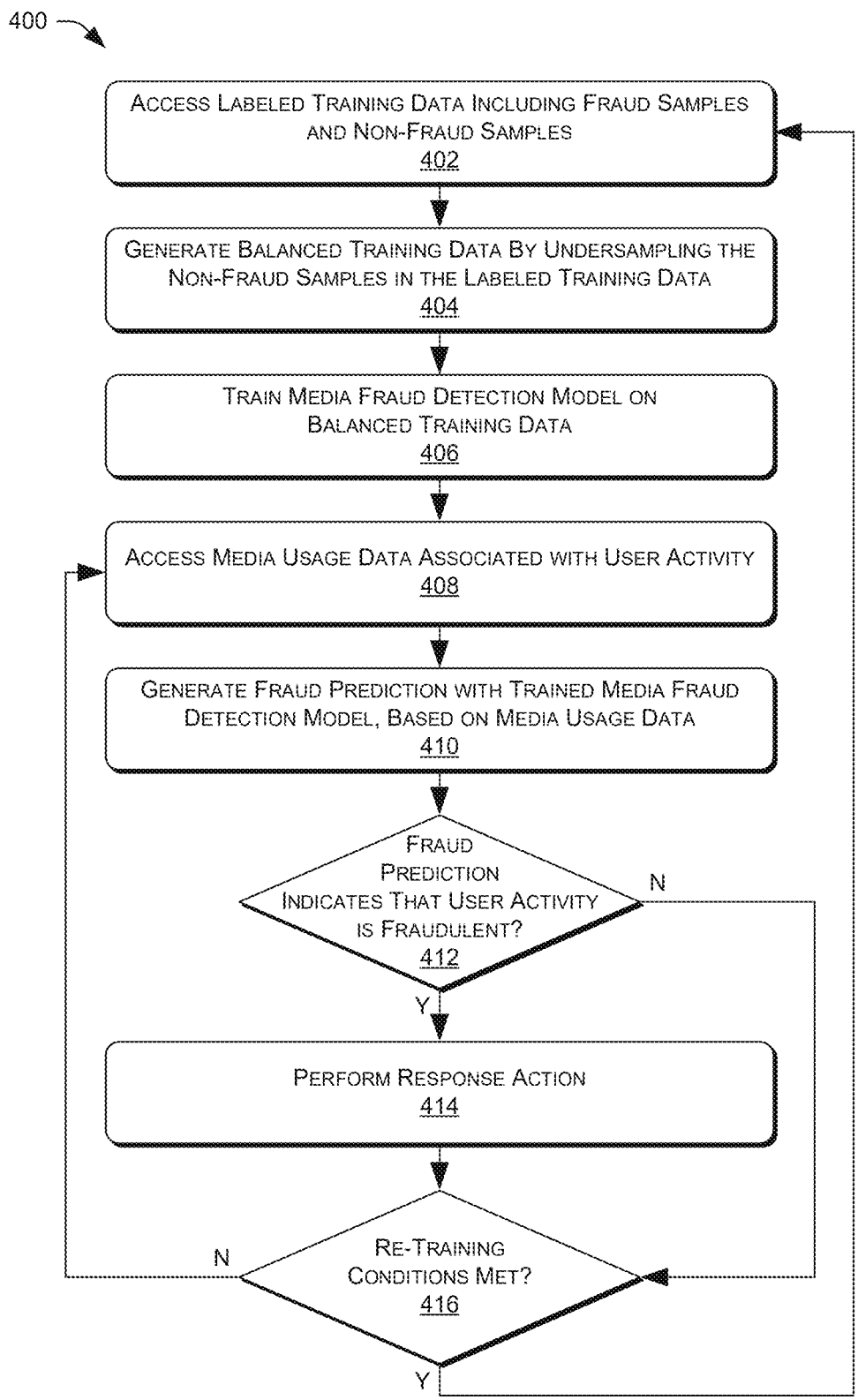
FIG. 4 is a flow diagram of an illustrative process for training the media fraud detection model based on balanced training data, and using the media fraud detection model to generate fraud predictions associated with media usage data.

FIG. 4 is a flow diagram of an illustrative process 400 for training the media fraud detection model 104 based on balanced training data 116, and using the media fraud detection model 104 to generate fraud predictions 106 associated with media usage data 108. Process 400 is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

At block 402, the training data balancer 120 may access labeled training data 122 generated by one or more preprocessing elements 118 based on historical media usage data 114. The labeled training data 122 may include user activity samples that have been labeled with binary labels indicating whether the user activity samples are fraud samples or non-fraud samples.

In some examples, the preprocessing elements 118 may use the process 300, described above with respect to FIG. 3, to generate the labeled training data 122. In other examples, one or more preprocessing elements 118 may generate labeled training data 122 in other ways. As an example, although the process 300 may involve operations performed by the heuristic labeler 124, an initial media fraud detection models 126, and experts 128, in some examples experts 128 may generate the labeled training data 122 manually and/or via other techniques without the use of the heuristic labeler 124 and/or the initial media fraud detection models 126.

As discussed above, because most user activity on the media service 110 may be legitimate, the labeled training data 122 accessed at block 402 may be unbalanced. For example, the labeled training data 122 may include a large number of labeled non-fraud samples, but relatively few labeled fraud samples.

Accordingly, at block 404 the training data balancer 120 may generate a balanced training data 116 by applying undersampling techniques to the non-fraud samples in the labeled training data 122. Using the undersampling techniques, the training data balancer 120 may select a relatively small subset of the non-fraud samples indicated by the labeled training data 122, such that the selected subset of non-fraud samples includes a reduced number of non-fraud samples that is equal to, or closer to, the number of fraud samples in the labeled training data 122. The training data balancer 120 may include the reduced number of non-fraud samples, selected from the labeled training data 122 via undersampling techniques, in the balanced training data 116 along with the fraud samples from labeled training data 122. Accordingly, the numbers of fraud samples and non-fraud samples may be equal in the balanced training data 116, or may be closer than in the labeled training data 122.

In some examples, the training data balancer 120 may generate the balanced training data 116 by undersampling the non-fraud samples via clustering techniques, as discussed above with respect to FIG. 2. For example, the training data balancer 120 may group the non-fraud samples in the labeled training data 122 into clusters 202, may identify centroids 206 of the clusters 202, and may select non-fraud samples that are at or are closest to the centroids 206 of the respective clusters 202. The non-fraud samples at or nearest to the centroids 206 of the clusters 202 may be the most representative samples of those clusters 202, such that selection of those non-fraud samples and their inclusion in the balanced training data 116 may allow the balanced training data 116 to include a representative selection of the full set of non-fraud samples indicated in the labeled training data 122. In other examples, the training data balancer 120 may generate the balanced training data 116 by undersampling the non-fraud samples via random selection or other undersampling techniques.

At block 406, the media fraud detection system 102 may use supervised machine learning techniques to train the media fraud detection model 104 based on the balanced training data 116 generated at block 404. In some examples, the media fraud detection model 104 may be a gradient boosted model, such as a LightGBM model, an XGBoost model, or a CatBoost model. In other examples, the media fraud detection model 104 may be another type of machine learning model, such as a deep learning model, non-linear model, or other type of machine learning model.

Because the balanced training data 116 may include equal numbers of fraud samples and non-fraud samples, or include numbers of fraud samples and non-fraud samples that are closer than in the labeled training data 122, the fraud samples may be a larger portion of the balanced training data 116 than in the labeled training data 122. Accordingly, although the fraud samples may have been a small minority class in the labeled training data 122 relative to a much larger majority class of non-fraud samples, the fraud samples and the non-fraud samples may be equal classes, or more balanced classes, in the balanced training data 116. The fraud samples may thus have a larger signal and/or a larger relative representation in the balanced training data 116, such that training the media fraud detection model 104 on the balanced training data 116 instead of on the labeled training data 122 may cause the media fraud detection model 104 to be able to more accurately predict instances of fraud associated with the media service 110.

After the media fraud detection model 104 is trained on the balanced training data 116 at block 406, the trained media fraud detection model 104 may access media usage data 108 associated with user activity on the media service 110 at block 408. The media usage data 108 may, for example, be associated with a current or recent instance of user activity on the media service 110, such that the media fraud detection model 104 may evaluate the user activity in real time, or in near real time within a threshold period of time after the user activity occurs.

At block 410, the media fraud detection model 104 may generate a fraud prediction 106 associated with the user activity. For example, during the training of the media fraud detection model 104 at block 406, the media fraud detection model 104 may have determined that certain types of features and/or patterns of features in user activity samples are indicative and/or predictive of fraudulent activity. Accordingly, the media fraud detection model 104 may identify instances of features in the media usage data 108 accessed at block 408, determine whether the instances of the features indicate that the user activity is likely to be fraudulent, and generate a corresponding fraud prediction 106. In some examples, the media fraud detection model 104 may also generate or indicate a confidence level associated with the fraud prediction 106 generated at block 410. The fraud prediction 106 may be output and/or provided to the media service 110.

At block 412, the media fraud detection system 102 or the media service 110 may determine whether the fraud prediction 106 generated at block 410 indicates that the corresponding user activity is likely to be fraudulent. If the fraud prediction 106 indicates that the corresponding user activity is likely to be fraudulent (Block 412—Yes), for instance because the fraud predictions 106 includes a fraud indicator and/or has a corresponding confidence level that exceeds a threshold level and is sufficient to indicate likely fraud, the media service 110 may perform a corresponding response action at block 414 to mitigate and/or account for the likely fraudulent activity.

For example, if the fraud prediction 106 indicates that the user activity is likely to be fraudulent, the media service 110 may avoid adjusting metrics in the media usage data 108 and/or retroactively correct for previous adjustments to the metrics based on the likely fraudulent behavior, may add the corresponding user 112 to a blacklist of fraudulent users, may block the user 112 from accessing the media service 110, may block the user 112 from uploading media content to the media service 110, may send a warning to the user 112, and/or may perform other response actions at block 414. In some examples, the media service 110 may determine which response action to perform at block 414 based on a confidence level of the fraud prediction 106.

If the fraud prediction 106 does not indicate that the corresponding user activity is likely to be fraudulent (Block 412—No), the media service 110 may avoid performing a corresponding response action at block 414. For instance, because the fraud prediction 106 indicates that the user activity is not likely to be fraudulent, the media service 110 may increment play counts or adjust other metrics in the media usage data 108 based on the user activity as normal, without performing a response action associated with likely or suspected fraud.

At block 416, the media fraud detection system 102 may determine whether conditions are met to re-train the media fraud detection model 104. For example, the media fraud detection model 104 may be set to be retrained periodically based on new or different balanced training data 116, if expert feedback disagrees with one or more fraud predictions 106 generated by the media fraud detection model 104, and/or upon the occurrence of other conditions. If the media fraud detection system 102 determines that such re-training conditions are not met (Block 416—No), the media fraud detection model 104 may access additional media usage data 108 associated with another instance of user activity at block 408, and may generate a corresponding fraud prediction 106 at block 410. The media fraud detection model 104 may continue generating fraud predictions 106 associated with instances of user activity, based on corresponding media usage data 108, until the media fraud detection system 102 determines that re-training conditions are met at block 416.

When the media fraud detection system 102 determines that re-training conditions are met (Block 416—Yes), the media fraud detection system 102 may return to block 402 to access new and/or additional labeled training data 122. The media fraud detection system 102 may process the new and/or additional labeled training data 122 as shown in FIG. 4, for instance to generate corresponding new and/or additional balanced training data 116 and to re-train the media fraud detection model 104 on the new and/or additional balanced training data 116. In some examples, the media fraud detection model 104 may also, or alternately, be retrained on expert feedback indicating whether fraud predictions 106 previously generated by the media fraud detection model 104 were or were not accurate, and/or based on other data. Accordingly, the media fraud detection model 104 may be retrained over time to become more accurate and/or to adjust to changes in user behavior, for instance to predict new or different forms of fraudulent activity developed by users 112 over time.

In some examples, a current or existing version of the media fraud detection model 104 may continue generating fraud predictions 106 for instances of user activity based on corresponding media usage data 108 while a new version of the media fraud detection model 104 is being re-trained. Once the new version of the media fraud detection model 104 has been re-trained based on new and/or additional data, the new version of the media fraud detection model 104 may be deployed to begin generating fraud predictions 106 for instances of user activity based on corresponding media usage data 108.

Figure 5:
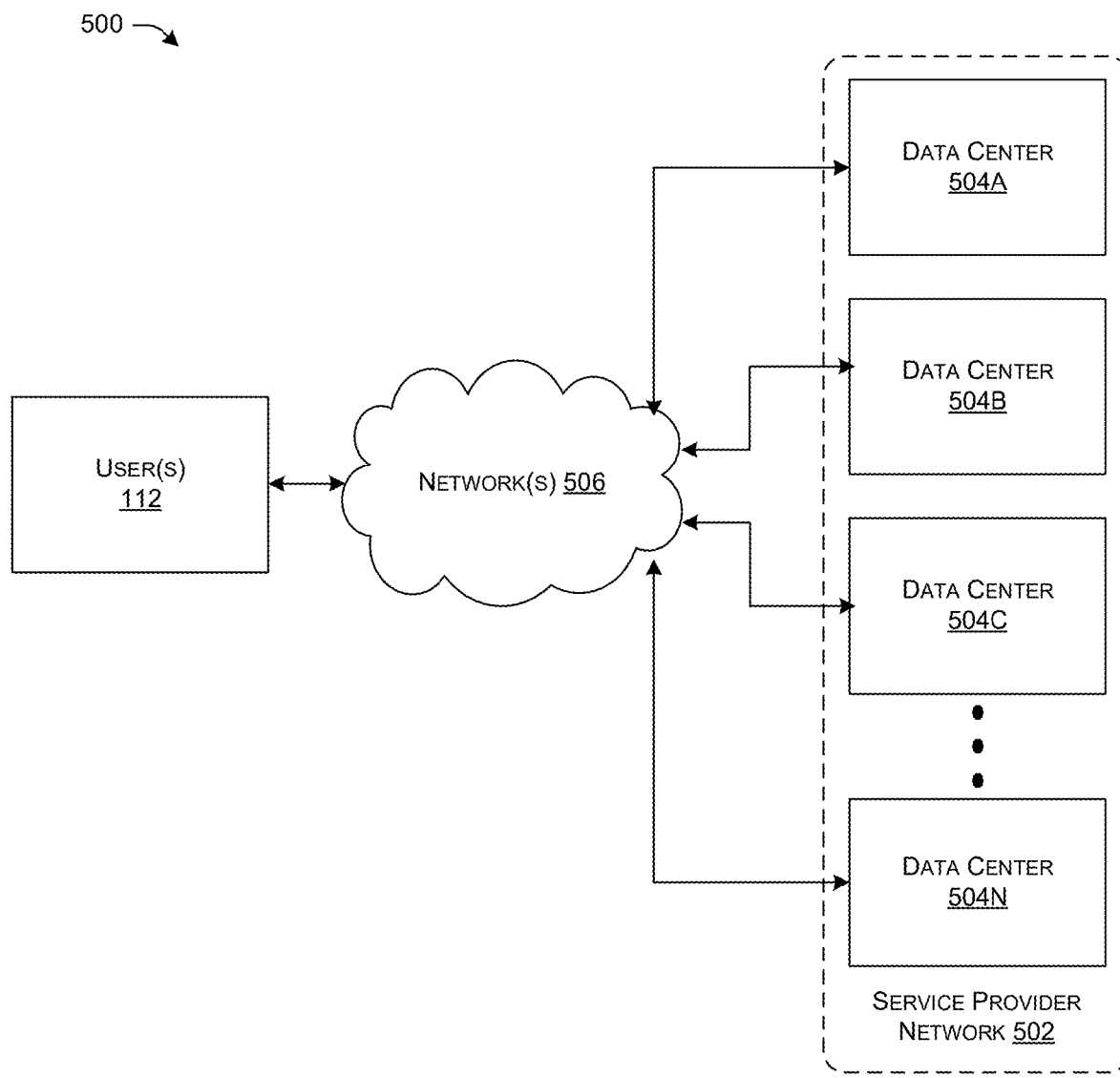
FIG. 5 is a system and network diagram that shows an illustrative operating environment for configurations disclosed herein.

FIG. 5 is a system and network diagram that shows an illustrative operating environment 500 for the configurations disclosed herein, which includes a service provider network 502 that can be configured to perform techniques disclosed herein. In some examples, the service provider network 502 can be an example of a cloud computing environment. Elements of the service provider network 502 can execute various types of computing and network services, such as data storage and data processing, and/or can provide computing resources for various types of systems on a permanent or an as-needed basis. For example, among other types of functionality, the computing resources provided by the service provider network 502 may be utilized to implement various services described above such as, for example, the media service 110 and/or the media fraud detection system 102 as discussed above. Accordingly, the computing resources provided by the service provider network 502 may be utilized to implement services and elements associated with the media service 110 and/or the media fraud detection system 102, such as the media fraud detection model 104, one or more preprocessing elements 118, the training data balancer 120, repositories of media usage data 108, historical media usage data 114, labeled training data 122, balanced training data 116, and/or fraud predictions 106, and/or other elements described herein. Additionally, the operating environment 500 can provide computing resources that include, without limitation, data storage resources, data processing resources, such as virtual machine (VM) instances, networking resources, data communication resources, network services, and other types of resources.

Each type of computing resource provided by the service provider network 502 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 502 can also be configured to provide other types of computing resources not mentioned specifically herein.

The computing resources provided by the service provider network 502 may be enabled in one embodiment by one or more data centers 504A-504N (which might be referred to herein singularly as "a data center 504" or in the plural as "the data centers 504"). The data centers 504 are facilities utilized to house and operate computer systems and associated components. The data centers 504 typically include redundant and backup power, communications, cooling, and security systems. The data centers 504 can also be located in geographically disparate locations. One illustrative embodiment for a data center 504 that can be utilized to implement the technologies disclosed herein will be described below with regard to FIG. 6.

The data centers 504 may be configured in different arrangements depending on the service provider network 502. For example, one or more data centers 504 may be included in, or otherwise make-up, an availability zone. Further, one or more availability zones may make-up or be included in a region. Thus, the service provider network 502 may comprise one or more availability zones, one or more regions, and so forth. The regions may be based on geographical areas, such as being located within a predetermined geographical perimeter.

Users and/or owners of the service provider network 502 may access the computing resources provided by the service provider network 502 over any wired and/or wireless network(s) 506, which can be a wide area communication network ("WAN"), such as the Internet, an intranet or an Internet service provider ("ISP") network or a combination of such networks. For example, and without limitation, computing device(s), e.g., computing devices associated with users and/or customers of the service provider can be utilized to access the service provider network 502 by way of the network(s) 506. As an example, computing devices associated with users 112 of the media service 110 can transmit data to, and/or receive data from, one or more of the data centers 504 of the service provider network 502 in order to access and/or use the media service 110 implemented via the service provider, for instance to access media content items via the media service 110 through the network(s) 506. It should be appreciated that a local-area network ("LAN"), the Internet, or any other networking topology known in the art that connects the data centers 504 to remote customers and other users can be utilized. It should also be appreciated that combinations of such networks can also be utilized.

Each of the data centers 504 may include computing devices that include software, such as applications that receive and transmit data. The data centers 504 can also include databases, data stores, or other data repositories that store and/or provide data. For example, data centers 504 can store and/or execute one or more instances of the media service 110 and/or media fraud detection system 102, and/or individual elements of the media fraud detection system 102 such as one or more preprocessing elements 118, the training data balancer 120, the media fraud detection model 104, elements that train the media fraud detection model 104 and/or initial media fraud detection models 126, and/or other elements described herein.

For instance, one or more data centers 504 can execute one or more of the preprocessing elements 118 of the media fraud detection system 102, for instance to train the initial media fraud detection models 126 and/or to generate labeled training data 122 from the historical media usage data 114. The same data centers 504, or different data centers 504, may also execute the training data balancer 120 to generate the balanced training data 116 from the labeled training data 122. The same data centers 504, or different data centers 504, may also train the media fraud detection model 104 based on the balanced training data 116, and/or may re-train the media fraud detection model 104 based at least in part on new and/or different training data obtained or determined over time. The same data centers 504, or different data centers 504, may also execute one or more trained instances of the media fraud detection model 104, such that the trained instances of the media fraud detection model 104 may process new media usage data 108 to generate corresponding media usage data 108.

Figure 6:
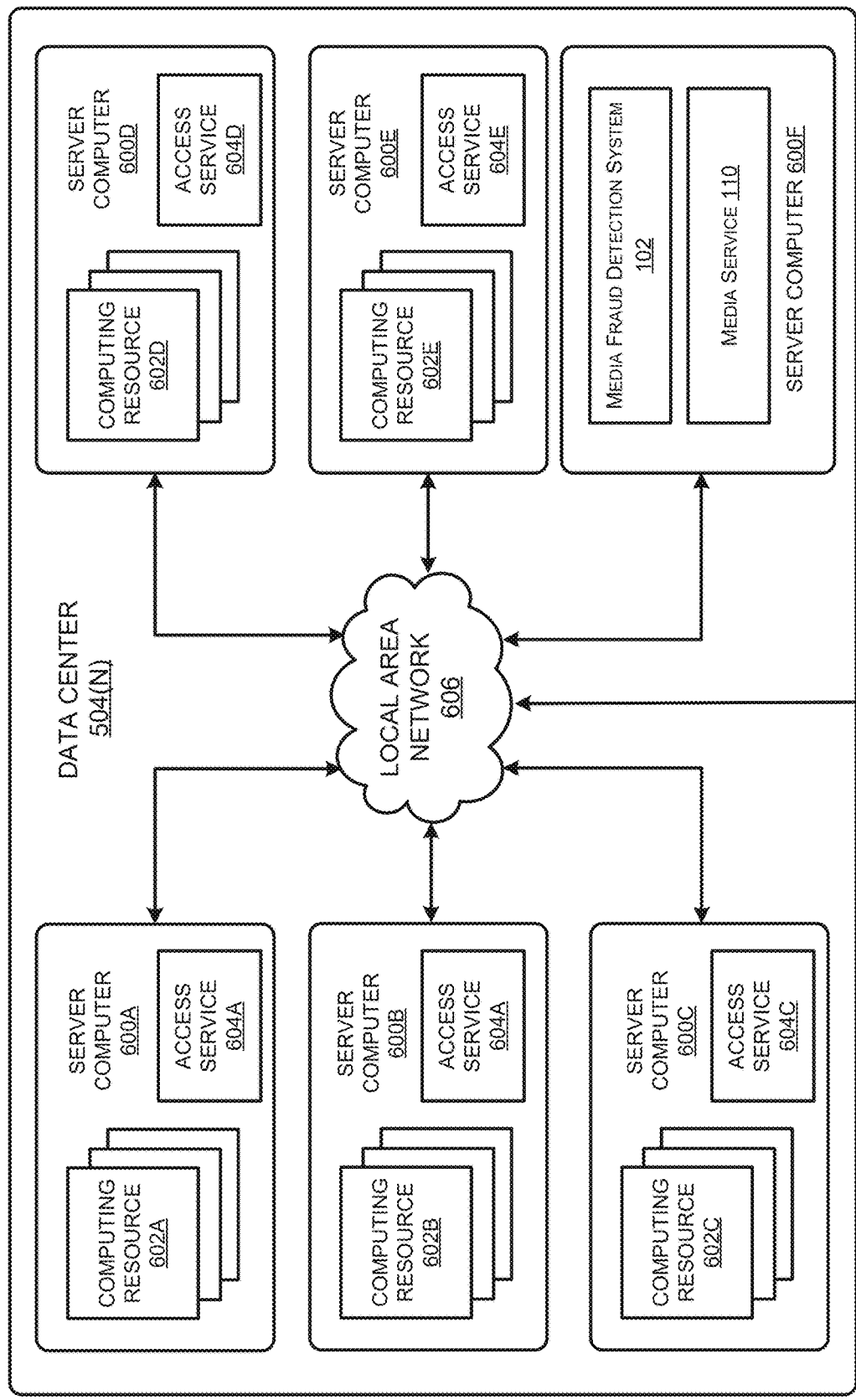
FIG. 6 is a computing system diagram that illustrates one configuration for a data center that can be utilized to implement one or more elements of the media service and/or the media fraud detection system.

FIG. 6 is a computing system diagram that illustrates one configuration for a data center 504(N) that can be utilized to implement one or more elements of the media service 110 and/or the media fraud detection system 102 as described above with respect to FIGS. 1-5. The example data center 504(N) shown in FIG. 6 includes several server computers 600A-600E (collectively 600) for providing computing resources 602A-602E (collectively 602), respectively.

The server computers 600 can be standard tower, rackmount, or blade server computers configured appropriately for providing the various computing resources (illustrated in FIG. 6 as the computing resources 602A-602E). The computing resources 602 can include, without limitation, analytics applications, data storage resources, data processing resources such as VM instances or hardware computing systems, database resources, networking resources, and others. Some of the server computers 600 can also be configured to execute access services 604A-604E (collectively 604) capable of instantiating, providing and/or managing the computing resources 602, some of which are described in detail herein.

The data center 504(N) shown in FIG. 6 also includes a server computer 600F that can execute any or all of the software components described above. For example, and without limitation, the server computer 600F can be configured to execute one or more elements of the media fraud detection system 102 and/or media service 110 described herein. The server computer 600F can also be configured to execute other components and/or to store data for providing some or all of the functionality described herein. For instance, the server computer 600F, or a different server computer 600, may store media content items and execute elements of the media service 110 to provide media content items to user devices associated with users 112. In this regard, it should be appreciated that components of the systems described herein can execute on many other physical or virtual servers in the data centers 504 in various configurations. For example, the media service 110, the preprocessing elements 118 of the media fraud detection system 102, the training data balancer 120 of the media fraud detection system 102, and/or the media fraud detection model 104 of the media fraud detection system 102 may execute via different server computers 600 of the same data center 504 or different data centers 504.

In the example data center 504(N) shown in FIG. 6, an appropriate LAN 606 is also utilized to interconnect the server computers 600A-600F. The LAN 606 is also connected to the network 506 illustrated in FIG. 5. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 504(1)-(N), between each of the server computers 600A-600F in each data center 504, and, potentially, between computing resources 602 in each of the data centers 504. It should be appreciated that the configuration of the data center 504 described with reference to FIG. 6 is merely illustrative and that other implementations can be utilized.

Figure 7:
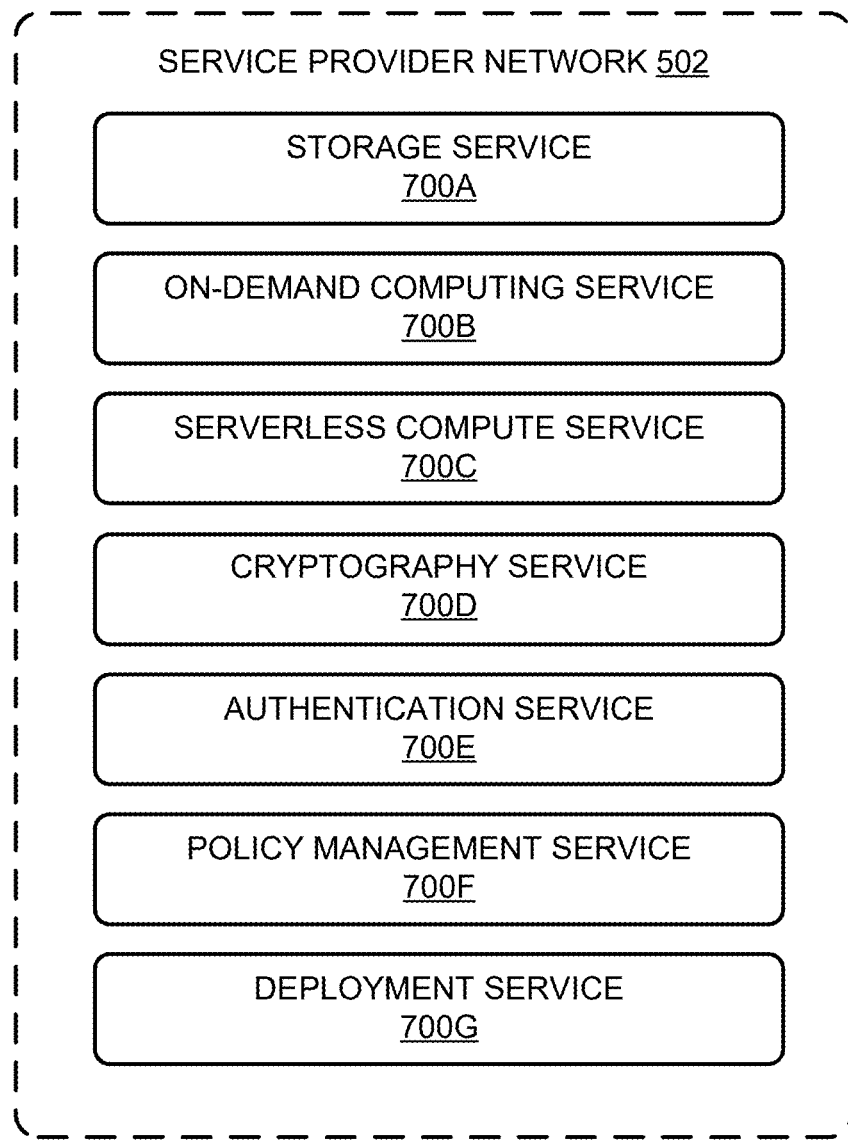
FIG. 7 is a system services diagram that shows aspects of several services that can be provided by and utilized within a service provider network.

FIG. 7 is a system services diagram that shows aspects of several services that can be provided by and utilized within the service provider network 502, which can be configured to implement the various technologies disclosed herein. The service provider network 502 can provide a variety of services to users including, but not limited to, a storage service 700A, an on-demand computing service 700B, a serverless compute service 700C, a cryptography service 700D, an authentication service 700E, a policy management service 700F, and a deployment service 700G. The service provider network 502 can also provide other types of computing services, some of which are described below.

In some examples, the services shown in FIG. 7 may be services that may be accessed and used by customers of the service provider. In other examples, the services shown in FIG. 7 may be services that may be used by elements of the media service 110 and/or media fraud detection system 102 executed by the service provider network 502, and/or may be used by other elements described herein.

It is also noted that not all configurations described include the services shown in FIG. 7 and that additional services can be provided in addition to, or as an alternative to, the services explicitly described herein. Each of the systems and services shown in FIG. 7 can also expose web service interfaces that enable a caller to submit appropriately configured API calls to the various services through web service requests. The various web services can also expose GUIs, command line interfaces ("CLIs"), and/or other types of interfaces for accessing the functionality that they provide. In addition, each of the services can include service interfaces that enable the services to access each other. Additional details regarding some of the services shown in FIG. 7 will now be provided.

The storage service 700A can be a network-based storage service that stores data obtained from customers and/or users of the service provider network 502 and/or from computing resources in the service provider network 502. In some examples, the data stored by the storage service 700A may be media usage data 108 and/or historical media usage data 114 indicative of usage of the media service 110 by users 112. In other examples, the data stored by the storage service 700A may include labeled training data 122, balanced training data 116, and/or other types of data used by elements described herein.

The on-demand computing service 700B can be a collection of computing resources configured to instantiate VM instances and to provide other types of computing resources on demand. For example, a user of the service provider network 502 can interact with the on-demand computing service 700B (via appropriately configured and authenticated API calls, for example) to provision and operate VM instances that are instantiated on physical computing devices hosted and operated by the service provider network 502. The VM instances can be used for various purposes, such as to operate as servers supporting the network services described herein, a web site, to operate business applications or, generally, to serve as computing resources for a user. Other applications for the VM instances can be to support database applications, electronic commerce applications, business applications and/or other applications. In some examples, one or more of instances of the media service 110 and/or elements of the media fraud detection system 102 may execute via computing resources provided by the on-demand computing service 700B. Although the on-demand computing service 700B is shown in FIG. 7, any other computer system or computer system service can be utilized in the service provider network 502 to implement the functionality disclosed herein, such as a computer system or computer system service that does not employ virtualization and instead provisions computing resources on dedicated or shared computers/servers and/or other physical devices.

The serverless compute service 700C is a network service that allows customers and other users to execute code (which might be referred to herein as a "function") without provisioning or managing server computers in the service provider network 502. Rather, the serverless compute service 700C can automatically run code in response to the occurrence of events. The code that is executed can be stored by the storage service 700A or in another network accessible location.

In this regard, it is to be appreciated that the term "serverless compute service" as used herein is not intended to infer that servers are not utilized to execute the program code, but rather that the serverless compute service 700C enables code to be executed without requiring a customer or other user to provision or manage server computers. The serverless compute service 700C executes program code only when needed, and only utilizes the resources necessary to execute the code.

The service provider network 502 can also include a cryptography service 700D. The cryptography service 700D can utilize storage services of the service provider network 502, such as the storage service 700A, to store encryption keys in encrypted form, whereby the keys can be usable to decrypt user keys accessible only to particular devices of the cryptography service 700D. The cryptography service 700D can also provide other types of functionality not specifically mentioned herein.

The service provider network 502, in various configurations, also includes an authentication service 700E and a policy management service 700F. The authentication service 700E, in one example, is a computer system (i.e., collection of computing resources) configured to perform operations involved in authentication of users or customers. For instance, one of the services shown in FIG. 7 can provide information from a user or customer to the authentication service 700E to receive information in return that indicates whether or not the requests submitted by the user or the customer are authentic.

The policy management service 700F, in one example, is a network service configured to manage policies on behalf of users or customers of the service provider network 502. The policy management service 700F can include an interface (e.g. API or GUI) that enables customers to submit requests related to the management of a policy, such as a security policy. Such requests can, for instance, be requests to add, delete, change, or otherwise modify policy for a customer, service, or system, or for other administrative actions, such as providing an inventory of existing policies and the like.

The service provider network 502 can additionally maintain other network services based, at least in part, on the needs of its customers. For instance, the service provider network 502 can maintain a deployment service 700G for deploying program code in some configurations. The deployment service 700G provides functionality for deploying program code, such as to virtual or physical hosts provided by the on-demand computing service 700B. Other services include, but are not limited to, database services, object-level archival data storage services, and services that manage, monitor, interact with, or support other services. The service provider network 502 can also be configured with other network services not specifically mentioned herein in other configurations.

Figure 8:
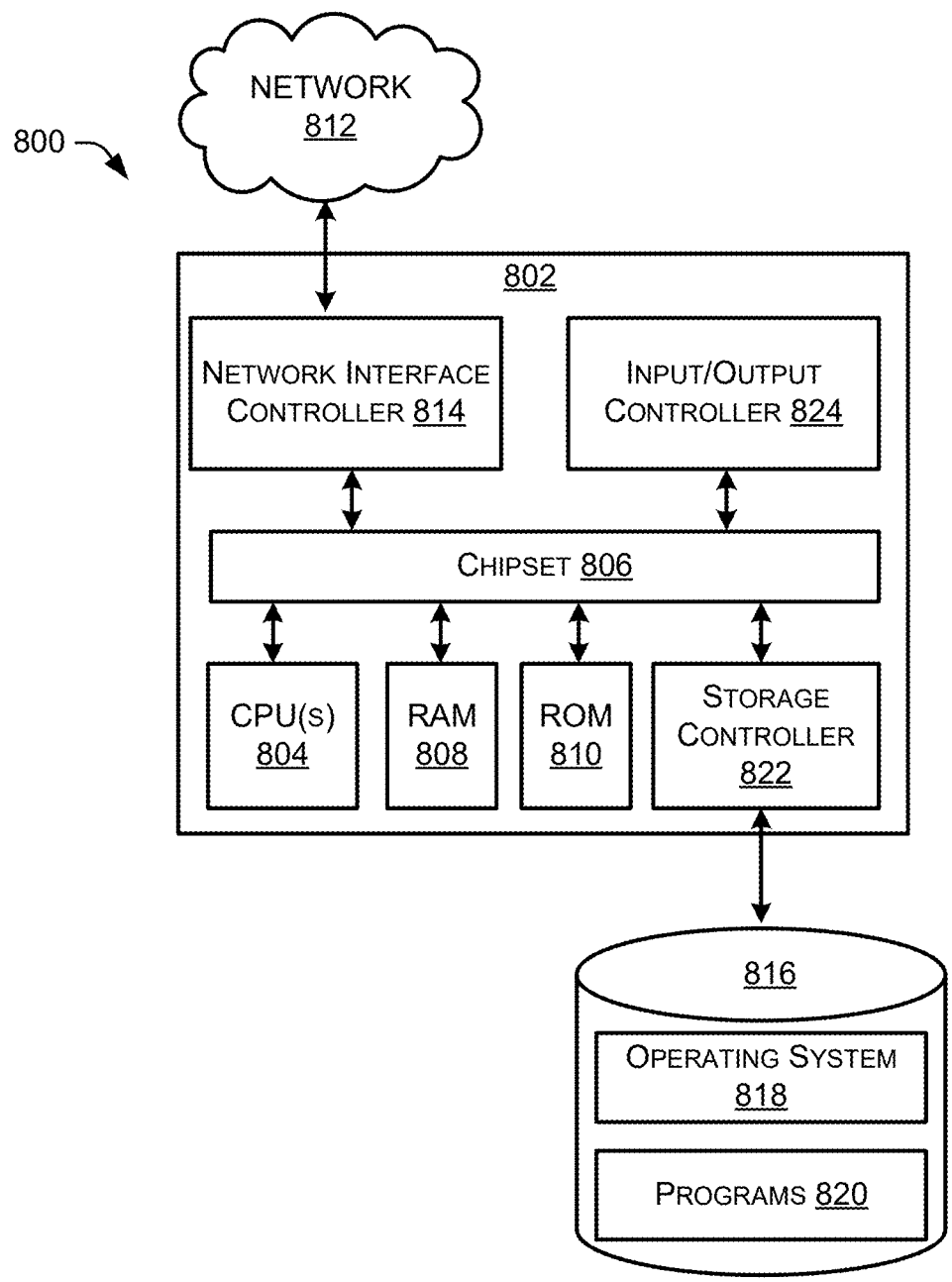
FIG. 8 shows an example computer architecture for a computer capable of executing program components for implementing functionality described herein.

FIG. 8 shows an example computer architecture for a computer 800 capable of executing program components for implementing functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein. For instance, in some examples, the computer 800 may be associated with one or more elements of the media service, the media fraud detection system 102, and/or other elements described herein.

The computer 800 includes a baseboard 802, or "motherboard," which may be one or more printed circuit boards to which a multitude of components and/or devices may be connected by way of a system bus and/or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as the network 812. The chipset 806 can include functionality for providing network connectivity through a NIC 814, such as a gigabit Ethernet adapter. The NIC 814 is capable of connecting the computer 800 to other computing devices over the network 812. It should be appreciated that multiple NICs 814 can be present in the computer 800, connecting the computer to other types of networks and remote computer systems.

The computer 800 can be connected to a mass storage device 816 that provides non-volatile storage for the computer. The mass storage device 816 can store an operating system 818, programs 820, and data, which have been described in greater detail herein. The mass storage device 816 can be connected to the computer 800 through a storage controller 822 connected to the chipset 806. The mass storage device 816 can consist of one or more physical storage units. The storage controller 822 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the mass storage device 816 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 816 is characterized as primary or secondary storage, and the like.

For example, the computer 800 can store information to the mass storage device 816 by issuing instructions through the storage controller 822 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the mass storage device 816 by detecting the physical states or characteristics of one or more particular locations within the physical storage units.

In addition to the mass storage device 816 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned above, the mass storage device 816 can store an operating system 818 utilized to control the operation of the computer 800. According to one configuration, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device 816 can store other system or application programs and data utilized by the computer 800.

In one configuration, the mass storage device 816 or other computer-readable storage media is encoded with computer-executable instructions which, when loaded into the computer 800, transform the computer from a general-purpose computing system into a special-purpose computer capable of implementing the configurations described herein. These computer-executable instructions transform the computer 800 by specifying how the CPUs 804 transition between states, as described above. According to one configuration, the computer 800 has access to computer-readable storage media storing computer-executable instructions which, when executed by the computer 800, perform the various processes described above. The computer 800 can also include computer-readable storage media for performing any of the other computer-implemented operations described herein.

The computer 800 can also include one or more input/output controllers 824 for receiving and processing input from a number of input devices, such as a keyboard, a mouse, a touchpad, a touch screen, an electronic stylus, or other type of input device. Similarly, an input/output controller 824 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or can utilize an architecture completely different than that shown in FIG. 8.

Based on the foregoing, it should be appreciated that technologies for detecting fraudulent activity associated with a media service 110 have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A method comprising:

accessing, by a computing system, historical media usage data associated with a music streaming service, wherein the historical media usage data indicates historical information indicative of usage of the music streaming service by users over a first time period;

generating, by the computing system, labeled training data based on the historical media usage data, wherein the labeled training data comprises binary labels identifying:

fraud samples associated with first instances of fraudulent activity by the users; and non-fraud samples associated with second instances of non-fraudulent activity by the users, wherein a first number of the non-fraud samples in the labeled training data exceeds a second number of the fraud samples in the labeled training data;

generating, by the computing system, balanced training data by:

undersampling the non-fraud samples by using k-means clustering to group the non-fraud samples into clusters and selecting a subset of the non-fraud samples based on centroids of the clusters, wherein the subset includes a lower number of the non-fraud samples than the first number; and including the subset of the non-fraud samples and the second number of the fraud samples in the balanced training data;

training, by the computing system, a gradient boosted machine model using supervised machine learning based on the balanced training data;

generating, by the computing system, and using the gradient boosted machine model, fraud predictions based on media usage data associated with the usage of the music streaming service by the users over a second time period; and performing, by the computing system, and based on the fraud predictions identifying one or more instances of the fraudulent activity on the music streaming service, one or more actions associated with the music streaming service in response to the one or more instances of the fraudulent activity.

2. The method of claim 1, wherein generating the labeled training data comprises generating at least a portion of the labeled training data by applying a set of heuristics, defining conditions associated with the fraud samples and the non-fraud samples, to the historical media usage data.

3. The method of claim 2, wherein generating the labeled training data further comprises:

training at least one initial media fraud detection model, using at least one of unsupervised machine learning or semi-supervised machine learning based on the portion of the labeled training data generated by applying the set of heuristics; and generating a second portion of the labeled training data by:

identifying a set of user activity samples in the historical media usage data that failed to satisfy the conditions defined by any of the set of heuristics; and labeling the set of user activity samples based on predictions by the at least one initial media fraud detection model indicating whether individual user activity samples, in the set of user activity samples, are likely to be associated with the fraudulent activity.

4. The method of claim 1, further comprising:

confirming or modifying the binary labels in the labeled training data based on expert feedback, wherein the balanced training data is generated from the labeled training data based on the binary labels confirmed or modified based on the expert feedback.

5. The method of claim 1, wherein the training of the gradient boosted machine model based on the balanced training data that includes the lower number of the non-fraud samples and the second number of the fraud samples causes the gradient boosted machine model to be more accurate than training the gradient boosted machine model on the labeled training data.

6. A method comprising:

accessing, by a computing system, historical media usage data associated with a media service, wherein the historical media usage data is indicative of historical usage of the media service by users;

generating, by the computing system, labeled training data based at least in part on the historical media usage data, wherein the labeled training data comprises one or more binary labels identifying:

one or more fraud samples associated with one or more first instances of fraudulent activity by the users; and one or more non-fraud samples associated with one or more second instances of non-fraudulent activity by the users;

generating, by the computing system, balanced training data by:

selecting a reduced subset of the one or more non-fraud samples; and including the reduced subset of the one or more non-fraud samples and the one or more fraud samples in the balanced training data;

training, by the computing system, a media fraud detection model using supervised machine learning based at least in part on the balanced training data; and generating, by the computing system, and using the media fraud detection model based at least in part on media usage data associated with usage of the media service by the users, one or more fraud predictions indicating one or more instances of the fraudulent activity.

7. The method of claim 6, wherein:

the media service provides media content items to the users via corresponding user devices, and the fraudulent activity by the users artificially adjusts one or more metrics tracked by the media service based at least in part on the media content items accessed by the users.

8. The method of claim 7, wherein the media service is configured to:

ignore the one or more instances of the fraudulent activity indicated by the one or more fraud predictions when determining the one or more metrics, and determine at least one of media charts, media recommendations, or royalty amounts based at least in part on the one or more metrics that are determined at least in part by ignoring the fraudulent activity.

9. The method of claim 6, wherein the media fraud detection model is a gradient boosted machine model.

10. The method of claim 6, wherein the one or more fraud predictions generated by the media fraud detection model indicate corresponding confidence levels.

11. The method of claim 6, wherein the labeled training data is generated based at least in part on at least one of:

a set of heuristics defining conditions that identify at least some of the one or more fraud samples and the one or more non-fraud samples, an initial media fraud detection model trained, via unsupervised machine learning or semi-supervised machine learning, to generate predictions identifying at least some of the one or more fraud samples and the one or more non-fraud samples, or expert input identifying at least some of the one or more fraud samples and the one or more non-fraud samples.

12. The method of claim 11, wherein the initial media fraud detection model is an anomaly detection classifier model or a gradient boosted machine model.

13. The method of claim 6, wherein the reduced subset of the one or more non-fraud samples in the balanced training data is generated by undersampling the one or more non-fraud samples in the labeled training data to reduce a number of the one or more non-fraud samples included in the balanced training data.

14. The method of claim 13, wherein the undersampling comprises randomly selecting individual non-fraud samples in the labeled training data.

15. The method of claim 13, wherein the undersampling comprises:
grouping the one or more non-fraud samples in the labeled training data into clusters of similar non-fraud samples;
identifying centroids of the clusters; and
selecting the one or more non-fraud samples at, or closest to, the centroids of the clusters.

16. A system comprising:
at least one preprocessing element configured to generate labeled training data based at least in part on historical media usage data indicative of historical usage of a media service by users, wherein the labeled training data comprises one or more binary labels identifying:
one or more fraud samples associated with one or more first instances of fraudulent activity by the users; and
one or more non-fraud samples associated with one or more second instances of non-fraudulent activity by the users;

a training data balancer configured to generate balanced training data by:
selecting a reduced subset of the one or more non-fraud samples; and
including the reduced subset of the one or more non-fraud samples and the one or more fraud samples in the balanced training data; and a media fraud detection model that is trained, using supervised machine learning based at least in part on the balanced training data, to generate one or more fraud predictions indicating one or more instances of the fraudulent activity based at least in part on media usage data associated with usage of the media service by the users.

17. The system of claim 16, wherein the media fraud detection model is a gradient boosted machine model.

18. The system of claim 16, wherein the at least one preprocessing element comprises one or more of:
a heuristic labeler configured to determine the one or more binary labels using a set of heuristics defining conditions indicative of at least some of the one or more fraud samples and the one or more non-fraud samples, or
an initial media fraud detection model trained, via unsupervised machine learning or semi-supervised machine learning, to generate predictions identifying at least some of the one or more fraud samples and the one or more non-fraud samples.

19. The system of claim 18, wherein the at least one preprocessing element modifies at least one of the one or more binary labels in the labeled training data based at least in part on expert input.

20. The system of claim 16, wherein the training data balancer selects the reduced subset of the one or more non-fraud samples by:
grouping the one or more non-fraud samples in the labeled training data into clusters of similar non-fraud samples;
identifying centroids of the clusters; and
selecting the one or more non-fraud samples at, or closest to, the centroids of the clusters.

* * * * *